US010287508B2

(12) United States Patent
Jack et al.

(10) Patent No.: US 10,287,508 B2
(45) Date of Patent: May 14, 2019

(54) MULTI-PURPOSE APPLICATION OF THE SECOND STAGE OF A 2-STAGE BIO-REFORMING REACTOR SYSTEM FOR REFORMING BIO-SYNGAS, NATURAL GAS AND PROCESS RECYCLE STREAMS

(71) Applicant: Sundrop Fuels, Inc., Longmont, CO (US)

(72) Inventors: Douglas S. Jack, Longmont, CO (US); Renus C. Kelfkens, Longmont, CO (US); Steve C. Lythgoe, Littleton, CO (US); Wayne W. Simmons, Longmont, CO (US)

(73) Assignee: Sundrop Fuels, Inc., Longmont, CO (US)

( * ) Notice: Subject to any disclaimer, the term of this patent is extended or adjusted under 35 U.S.C. 154(b) by 0 days.

(21) Appl. No.: 15/946,978

(22) Filed: Apr. 6, 2018

(65) Prior Publication Data

US 2018/0291278 A1 Oct. 11, 2018

Related U.S. Application Data

(60) Provisional application No. 62/483,115, filed on Apr. 7, 2017.

(51) Int. Cl.
*C07C 1/00* (2006.01)
*C10G 1/00* (2006.01)
(Continued)

(52) U.S. Cl.
CPC ............... *C10G 2/34* (2013.01); *C01B 3/382* (2013.01); *C10B 49/10* (2013.01); *C10J 3/466* (2013.01);
(Continued)

(58) Field of Classification Search
CPC ................................... C07C 1/00; C10G 1/00
(Continued)

(56) References Cited

U.S. PATENT DOCUMENTS 8,814,961 B2 8/2014 Perkins et al.
8,961,628 B2 2/2015 Ampulski et al.
(Continued)

FOREIGN PATENT DOCUMENTS

WO 2013148610 A1 10/2013
WO 2013158343 A1 10/2013
(Continued)

*Primary Examiner* — Thuan D Dang
(74) *Attorney, Agent, or Firm* — Rutan & Tucker, LLP

(57) ABSTRACT

Multiple stages of reactors form a bio-reforming reactor that generates chemical grade bio-syngas for any of 1) a methanol synthesis reactor, 2) a Methanol-to-Gasoline reactor train, 3) a high temperature Fischer-Tropsch reactor train, and 4) any combination of these three that use the chemical grade bio-syngas derived from biomass fed into the bio-reforming reactor. A tubular chemical reactor of a second stage has inputs configured to receive chemical feedstock from at least two sources, i) the raw syngas from the reactor output of the first stage via a cyclone, and ii) purge gas containing renewable carbon-based gases that are recycled back via a recycle loop as a chemical feedstock from any of 1) the downstream methanol-synthesis-reactor train, 2) the downstream methanol-to-gasoline reactor train, or 3) purge gas from both trains. The plant produces fuel products with solely 100% biogenic carbon content as well as fuel products with 50-100% biogenic carbon content.

20 Claims, 7 Drawing Sheets

(51) Int. Cl.
  *C10G 2/00* (2006.01)
  *C10J 3/46* (2006.01)
  *C10J 3/48* (2006.01)
  *C10J 3/84* (2006.01)
  *C10B 49/10* (2006.01)
  *C10K 1/32* (2006.01)
  *C10K 3/00* (2006.01)
  *C10L 1/04* (2006.01)
  *C01B 3/38* (2006.01)

(52) U.S. Cl.
  CPC .............. *C10J 3/485* (2013.01); *C10J 3/84* (2013.01); *C10K 1/32* (2013.01); *C10K 3/008* (2013.01); *C10L 1/04* (2013.01); *C01B 2203/0233* (2013.01); *C01B 2203/062* (2013.01); *C10J 2300/092* (2013.01); *C10J 2300/0976* (2013.01); *C10J 2300/1659* (2013.01); *C10J 2300/1665* (2013.01); *C10J 2300/1807* (2013.01); *C10J 2300/1853* (2013.01)

(58) Field of Classification Search
  USPC .................. 585/240, 242, 310; 208/49
  See application file for complete search history.

(56) References Cited

U.S. PATENT DOCUMENTS

| | | |
|---|---|---|
| 9,011,560 B2 | 4/2015 | Simmons et al. |
| 9,126,173 B2 | 9/2015 | Ampulski et al. |
| 9,295,961 B2 | 3/2016 | Laska et al. |
| 9,416,077 B2 | 8/2016 | Kelfkens et al. |
| 9,447,326 B2 | 9/2016 | Ferraro et al. |
| 9,663,363 B2 | 5/2017 | Simmons et al. |
| 2013/0247448 A1 | 9/2013 | Ampulski et al. |
| 2013/0248760 A1 | 9/2013 | Ampulski et al. |
| 2014/0241949 A1 | 8/2014 | Perkins et al. |
| 2014/0341785 A1 | 11/2014 | Simmons et al. |
| 2016/0152905 A1 | 6/2016 | Kelfkens et al. |
| 2017/0066983 A1 | 3/2017 | Jack et al. |

FOREIGN PATENT DOCUMENTS

| | | |
|---|---|---|
| WO | 2013191897 A1 | 12/2013 |
| WO | 2014043552 A1 | 3/2014 |
| WO | 2014204519 A1 | 12/2014 |
| WO | 2016086141 A1 | 6/2016 |

MULTI-PURPOSE APPLICATION OF THE SECOND STAGE OF A 2-STAGE BIO-REFORMING REACTOR SYSTEM FOR REFORMING BIO-SYNGAS, NATURAL GAS AND PROCESS RECYCLE STREAMS

RELATED APPLICATIONS

This application claims priority to U.S. provisional patent application Ser. No. 62/483,115, titled, "Multi-Purpose Application of the Second Stage of a 2-Stage Bio-Reforming Reactor System for Reforming Bio-Syngas, Natural Gas and Process Recycle Streams," filed Apr. 7, 2017, and incorporates its contents in their entirety by reference.

FIELD

The design generally relates to an Integrated Process Plant having a biomass reforming reactor using recycle loops.

BACKGROUND

Many economists plan for reducing global-warming emissions include different technologies to create, track, and measure an amount of renewable carbon in fuel sources. The renewable carbons in these fuels are a result of the biogenic content of the feedstocks used to create these fuels. The specific renewable (or biogenic) carbon content of these biofuels vary with the configuration of the production process.

SUMMARY

Systems and methods are discussed for an integrated plant that include a bio-reforming reactor (BRR) consisting of two or more stages to generate syngas from biomass, one or more recirculation loops, and any of a methanol synthesis reactor, a Methanol-to-Gasoline (MTG) reactor train process, a Fischer-Tropsch reactor train, or another chemical process that uses the syngas product derived from the biomass in the bio-reforming reactor.

In an embodiment, an interconnected set of two or more stages of reactors form the bio-reforming reactor that generate chemical grade bio-syngas for any of 1) a methanol synthesis reactor, 2) a MTG reactor train, 3) a high temperature Fischer-Tropsch reactor train, and 4) any combination of these three that use the chemical grade bio-syngas derived from biomass fed into the bio-reforming reactor.

A first stage of the bio-reforming reactor includes a first reactor that has one or more stream inputs to feed heat absorbing media, a vessel to circulate the heat absorbing media, one or more supply inputs to feed the biomass including wood chips, and has a sparger to input steam. The first stage is configured to cause a chemical reaction of the biomass including the wood chips into its reaction products of constituent gases, tars, chars, and other components, which exit as raw syngas through a reactor output from the first stage.

A tubular chemical reactor of a second stage of the BRR has one or more inputs configured to receive chemical feedstock from at least two sources, i) the raw syngas from the reactor output of the first stage via a cyclone, and ii) purge gas containing renewable carbon-based gases that are recycled back via a recycle loop as a chemical feedstock from any of 1) a downstream methanol-synthesis-reactor train, 2) a downstream methanol-to-gasoline reactor train, or 3) purge gas from both trains. The tubular chemical reactor has a first input configured to receive the raw syngas that includes the constituent gases and at least some of the tars from the first stage. The tubular chemical reactor has a second input configured to receive the renewable carbon based gases from the purge gases. The tubular chemical reactor employs a catalyst bed or catalyst tube coating tailored to crack phenolic tars (C6+) and reform light hydrocarbon gases (C1-C4) contained in any of 1) the raw syngas from the first stage of the BRR and 2) purge gases from the recycle loop in order to remove the tars and light hydrocarbon gases; and thus, create the chemical grade bio-syngas that is then sent out an output of the tubular chemical reactor.

A downstream fuel train is configured to receive the chemical grade bio-syngas, which was derived from the biomass that includes the wood chips. The downstream fuel train can be any of 1) the methanol synthesis reactor, 2) the Methanol-to-Gasoline reactor train, 3) the high temperature Fischer-Tropsch reactor train, and 4) any combinations of these three, that use the chemical grade bio-syngas to produce any of 1) fuel products with 100% biogenic carbon content, 2) fuel products with 50-100% biogenic carbon content, and 3) any combination of fuel products with solely 100% biogenic carbon content as well as fuel products with 50-100% biogenic carbon content.

In an embodiment, a multi-purpose application of the second stage of the bio-reforming reactor system occurs for reforming i) bio-syngas, ii) natural gas and/or iii) process recycle streams.

BRIEF DESCRIPTION OF THE DRAWINGS

The multiple drawings refer to the example embodiments of the design.

Figure 1:
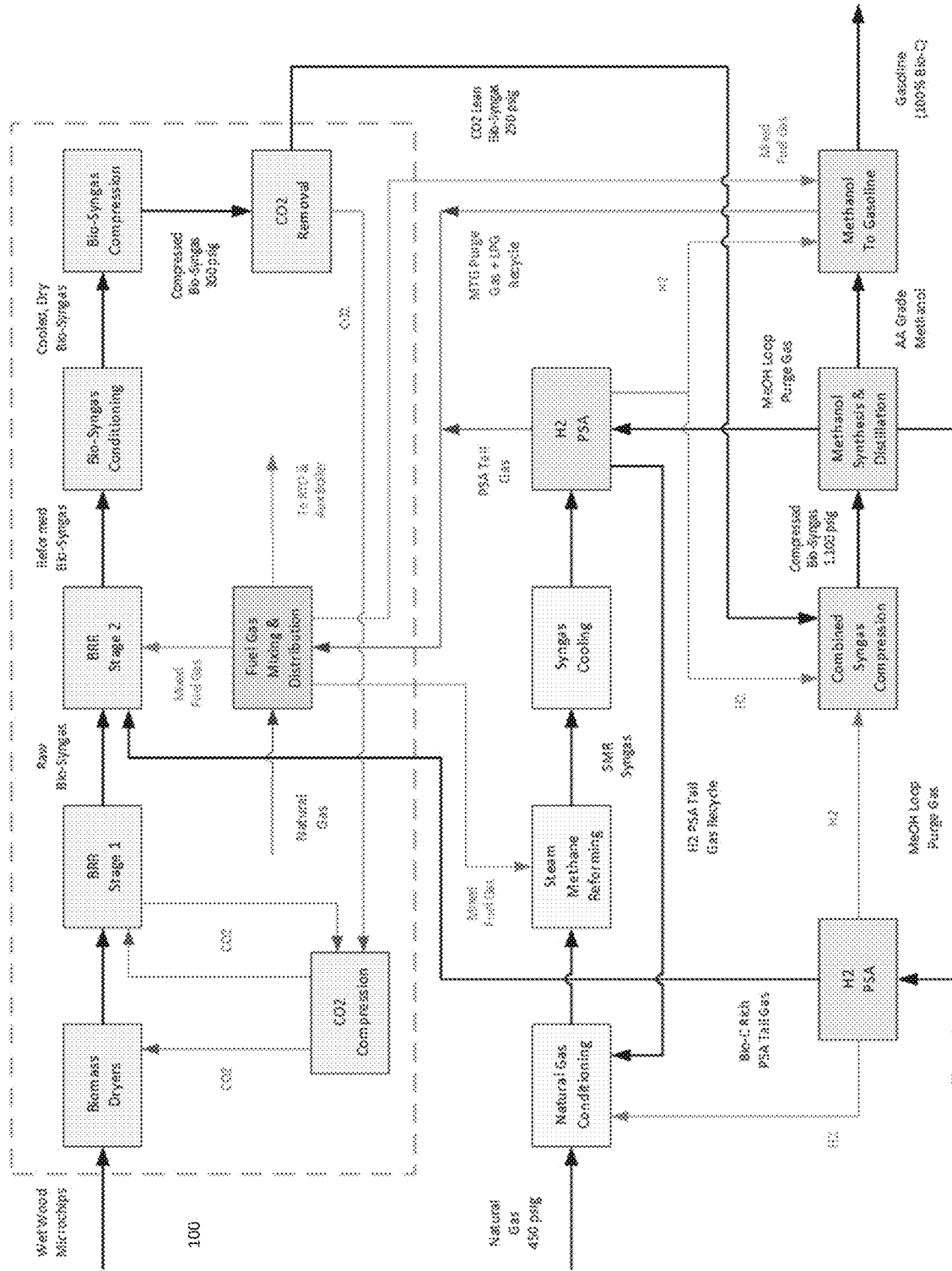
FIG. 1 illustrates a diagram of an embodiment of integrated plant with an interconnected set of two or more stages of reactors that produces fuel products with 100% biogenic carbon content.

While the design is subject to various modifications and alternative forms, specific embodiments thereof have been shown by way of example in the drawings and will herein be described in detail. The design should be understood to not be limited to the particular forms disclosed, but on the contrary, the intention is to cover all modifications, equivalents, and alternatives falling within the spirit and scope of the design.

DETAILED DISCUSSION

In the following description, numerous specific details are set forth, such as examples of specific chemicals, named components, connections, types of heat sources, specific numeric values given for an example design, etc., in order to provide a thorough understanding of the present design. It will be apparent, however, to one skilled in the art that the present design may be practiced without these specific details. In other instances, well known components or methods have not been described in detail but rather in a block diagram in order to avoid unnecessarily obscuring the present design. Further, specific numeric references such as a first reactor, can be made. However, the specific numeric reference should not be interpreted as a literal sequential order but rather interpreted that the first reactor is different than a second reactor. Thus, the specific details set forth are merely exemplary. The specific details can be varied from and still be contemplated to be within the spirit and scope of the present design. The term coupled is defined as meaning connected either directly to the component or indirectly to the component through another component. Concepts discussed for a first embodiment may be implemented in another embodiment where that is logically possible.

In general, a number of example processes for and apparatuses associated with a biomass conversion are described. The following drawings and text describe various example implementations and operating configurations for an integrated plant. The integrated biofuels plant in its various configurations for biomass conversion employs a multi-stage bio-reforming reactor system, such as a two-stage bio-reforming reactor system, in which the renewable carbon content of gasoline, jet fuel, diesel fuel, and/or similar fuels, are optimized for value to include: 1) Products with 100% biogenic carbon content and 2) products with 50-100% biogenic carbon. FIGS. 1-7 show various examples of how the bio-reforming reactor may be implemented. The plant may use various options for the multipurpose application of the second stage of a 2-stage bio-reforming reactor system for reforming bio-syngas, natural gas and/or process recycle streams such that the downstream fuel trains produce 1) fuel products with the desired biogenic carbon content. The process will include a Steam Methane Reformer (SMR) in some embodiments and will not include a SMR in some embodiments.

1) Products with 100% Biogenic Carbon Content

FIG. 1 illustrates a diagram of an embodiment of integrated plant with an interconnected set of two or more stages of reactors that produces fuel products with 100% biogenic carbon content.

The integrated plant 100 may consist of multiple connected components including a multiple stage bio-reforming reactor, a biomass feed system, one or more feedback loops connected to at least the tubular chemical reactor of the second stage, a methanol-synthesis-reactor train, and many other connected components in order to produce fuel products with 100% biogenic carbon.

FIG. 1 shows an integrated plant 100 in which biomass, including wood chips, is used for biogenic carbon, natural gas is supplied for hydrogen rich syngas, and a recycle loop rich in renewable carbons is used to supply recycled carbon based gases as feedstock into the tubular reactor of the second stage to conserve biogenic carbon.

The biomass feed system supplies biomass chips, such as wood chips, from a mill or onsite chipper into a biomass dryer system. The wood chips may be 1-2 inches on average.

A first stage of the bio-reforming reactor includes a circulating fluidized bed reactor that has one or more stream inputs to feed heat absorbing media, including silica sand, ilmenite, olivine, dolomite, zeolite catalysts and any combination of the five, a vessel to circulate the heat absorbing media, one or more feed supply inputs to feed biomass from the biomass feed system to the circulating fluidized bed reactor, and a sparger to input steam at or near a bottom of the circulating fluidized bed reactor. The circulating fluidized bed reactor of the first stage is configured to cause chemical reactions of the biomass into its reaction products of constituent gases, tars, chars, and other components, which exit through an output from the circulating fluidized bed of the first stage. The raw bio-syngas, for eventual methanol production, is sent to the tubular chemical reactor in the second stage for tar conversion/cracking and reforming methane and other light hydrocarbons (C1-C4) in the stream from the output of the first stage in order for the second stage to produce chemical grade bio-syngas.

The tubular chemical reactor of a second stage of the bio reforming reactor has two or more inputs configured to receive chemical feedstock from at least two sources, i) the raw syngas from the reactor output of the first stage via a cyclone, and ii) purge gas containing renewable carbon-based gases that are recycled back via a recycle loop as a chemical feedstock from any of 1) a downstream methanol-synthesis-reactor train, 2) a downstream methanol-to-gasoline reactor train, or 3) purge gas from both trains. The tubular chemical reactor has a first input configured to receive the raw syngas from the first stage that includes the constituent gases and at least some of the tars. The tubular chemical reactor has a second input configured to receive the renewable carbon based gases from the purge gases. The tubular chemical reactor employs a catalyst (bed or coated tubes) tailored to crack phenolic tars (C6+) and reform light hydrocarbon gases (C1-C4) contained in any of 1) the raw syngas from the first stage of the bio-reforming reactor and 2) purge gases from the recycle loop in order to remove the tars and light hydrocarbon gases; and thus, create the chemical grade bio-syngas that is then sent out an output of the tubular chemical reactor.

The second stage includes heaters for the tubular chemical reactor of the second stage to maintain an operating temperature of that reactor of at least 700 degree C. The second stage heats up to crack the tars and reform the light hydrocarbons (C1-C4) in the syngas or purge gases with a catalyst in order to remove those components from the resulting chemical grade syngas that are harmful for subsequent chemical reactions and processes.

Again, the tubular chemical reactor may use a catalyst bed or catalyst coating on the inside of the tubes to chemically react the raw syngas and other recycled process gases from the system to make the raw syngas from the first stage and other recycled process gases from the recycle loops into a chemical grade bio-syngas by further cracking and/or reforming the tars, excess methane, etc. into their constituent molecules so that a resultant syngas stream going out a reactor output of the second stage can be used in other chemical reactions rather than just being a source of fuel for burning.

In an embodiment, the second stage of the bio-reforming reactor can be a fired tubular reactor similar to a SMR that employs a proprietary catalyst tailored to crack phenolic tars (C6+) and reform light hydrocarbon gases (C1-C4) contained in the bio-syngas produced by biomass gasification in the first stage of the BRR. The second stage of the bio-reforming reactor can also be used as a multi-purpose reformer to concurrently process natural gas and recycled integrated plant process gases in conjunction with the bio-syngas from first stage of the BRR. The second stage of the bio-reforming reactor can reform bio-syngas concurrently with natural gas and/or recycled process gas streams to maximize overall process energy efficiency and/or minimize capital costs.

One or more feedback loops connect to at least the tubular chemical reactor of the second stage including a carbon-dioxide gas feedback loop.

The integrated plant 100 includes a first recycling loop of carbon-based gases from the system processes to be reused in other parts of the integrated system in order to have a 100% biogenic carbon content rating. The biomass dryer receives its CO2 motive gas as well as heated CO2 gas to dry the biomass from recycled CO2 gas from a carbon dioxide compressor. The CO2 gas is derived and recycled from the chemical grade bio-syngas coming from the reactor output of the tubular chemical reactor of the second stage after that syngas has gone through the syngas conditioning components, the syngas compression component, and a CO2 removal unit. The CO2 removal unit separates CO2 from the bio syngas. The CO2 removal unit sends the carbon dioxide to a carbon dioxide compressor. The carbon dioxide compressor supplies the heated recycled CO2 gases to the biomass dryer as well as to a lock hopper system that uses CO2 gas. The lock hopper uses the CO2 gas to pressurize; and thus, move the wood chips to go across the pressure boundary into the first stage/gasifier of the bio-reforming reactor. Thus, the biomass, such as wood chips, is supplied to the one or more feed supply inputs of the circulating fluidized bed reactor. The circulating fluidized bed reactor of the bio reforming reactor will gasify and cause chemical reactions of those wood chips to break down the complex molecular chemical bonds making up the wood chip into its constituent parts of char, methane, hydrogen, carbon oxide, steam, and other parts.

Overall, a fraction of the CO2 gas is removed from the chemical grade bio-syngas to supply CO2 gas to the lock-hoppers and biomass dryers in the biomass feed system. If necessary, more bio-syngas CO2 gas is removed to satisfy a minimum methanol feed modulus ratio (or Ribblett ratio for the Fischer-Tropsch process).

Next, the integrated plant 100 includes a second recycling loop of carbon-based gases from the system processes to be reused in other parts of the integrated system in order to achieve a 100% biogenic carbon content rating. For example, a fuel gas mixing and distribution component is configured to receive fuel gas from a number of sources and then send the fuel gas to the heaters of different reactors and trains in the integrated plant.

In an embodiment, the fuel gas mixing and distribution unit has multiple source feeds including a natural gas input to receive natural gas in addition to a purge gas input to receive purge gases containing renewable carbon based gases from both the methanol-to-gasoline reactor train and the hydrogen pressure swing absorber connected to the methanol-synthesis-reactor train. The fuel gas mixing and distribution unit is also then configured to distribute fuel gas to at least i) heaters in the tubular chemical reactor of the second stage, ii) heaters in the Methanol-to-Gasoline train, iii) heaters for the SMR, and iv) other plant uses.

Next, the integrated plant 100 includes a hydrogen recirculation feedback loop configured to cooperate with a H2 pressure swing adsorption (PSA) to recover hydrogen gas and send that hydrogen to a natural gas conditioning unit and a syngas combiner and compression unit.

A second hydrogen pressure swing absorber is configured to send the carbon-rich tail gases back to an input of a steam methane reformer via a natural gas conditioning unit. The natural gas conditioning unit has an input to receive at least natural gas supplied to its input as well as these recycled tailed gases from the second hydrogen pressure swing absorber. This combination of gases is supplied to an input of the steam methane reformer.

The steam methane reformer is configured to generate a stream of exit gases selected from a group consisting of 1) hydrogen gas, 2) a hydrogen-rich syngas composition, in which a ratio of hydrogen-to-carbon monoxide is higher than a ratio generally needed for methanol synthesis or Fischer-Tropsch processes, and 3) any combination of the two, to be mixed with a potentially carbon-monoxide-rich syngas composition, in which a ratio of carbon monoxide to hydrogen is higher than the ratio generally needed for methanol synthesis or Fischer-Tropsch processes. The carbon-monoxide-rich syngas composition is from the chemical grade bio-syngas produced by the second stage. Hydrogen is produced from natural gas using the SMR and hydrogen recovered by the hydrogen PSA. The hydrogen rich syngas is mixed with the chemical grade bio-syngas to yield syngas that satisfies the methanol modulus requirement for the synthesis loop.

A syngas combiner and compression unit is configured to receive chemical feedstock gas from all three of i) the chemical grade bio-syngas produced by the second stage, ii) the exit gases from the steam methane reformer, and iii) the hydrogen from the hydrogen pressure swing absorber, to locally control a feed modulus ratio for a hydrogen to carbon monoxide ratio needed for methanol synthesis or high temperature Fischer-Tropsch processes.

A downstream fuel train is configured to receive the chemical grade bio-syngas, which was derived from the biomass that includes the wood chips. The downstream fuel train can be any of 1) the methanol synthesis reactor, 2) the Methanol-to-Gasoline reactor train, 3) the high temperature Fischer-Tropsch reactor train, and 4) any combinations of these three, that use the chemical grade bio-syngas derived from the biomass in order to produce fuel products with 100% biogenic carbon content.

For example, the methanol-synthesis-reactor train couples downstream of the CO2 separation unit and a syngas compression unit to receive the chemical grade syngas as a chemical feedstock in order to generate methanol from the chemical grade syngas. The methanol synthesis distillation train sends the produced methanol to a further fuel making process.

In this shown example, the methanol synthesis distillation train sends the produced methanol to a Methanol-to-Gasoline train. The gasoline produced by the methanol-to-gasoline has a 100% biogenic carbon content.

Note, a high temperature Fischer-Tropsch reactor train could receive these same inputs and replace the methanol synthesis train and methanol to gas train in the integrated plant.

As such, FIG. 1 shows an integrated plant 100 in which:
This process has a concurrent feed of raw bio-syngas from Stage 1 of the bio-reforming reactor with a recycle gas from the methanol synthesis loop.
Raw bio-syngas is generated by Stage 1 of the biomass-reforming reactor.

Raw bio-syngas is mixed with a bio-C rich recycle gas and sent to Stage 2 of the bio-reforming reactor to convert tars and reform $C_1$-$C_4$ hydrocarbons.

A fraction of the $CO_2$ is removed from the bio-syngas coming out of the second stage of the BRR in order to supply $CO_2$ to the bio-reforming reactor lock-hoppers and biomass dryers.

A separate hydrogen PSA unit is used to recover hydrogen from methanol synthesis loop purge gas. The PSA tail gas is recycled back to second stage of the BRR to conserve biogenic carbon.

Natural gas, PSA tail gas, MTG purge gas and LPG are used as fuel gas to fire heaters in: the second stage of the BRR, the SMR furnace, MTG fired heaters, the auxiliary boiler and the RTO.

All electricity is imported.

This configuration yields a 100% biogenic carbon product with a satisfactory life-cycle greenhouse gas reduction using minimum biomass.

(2) Products with 50-100% Biogenic Carbon

Figure 2:
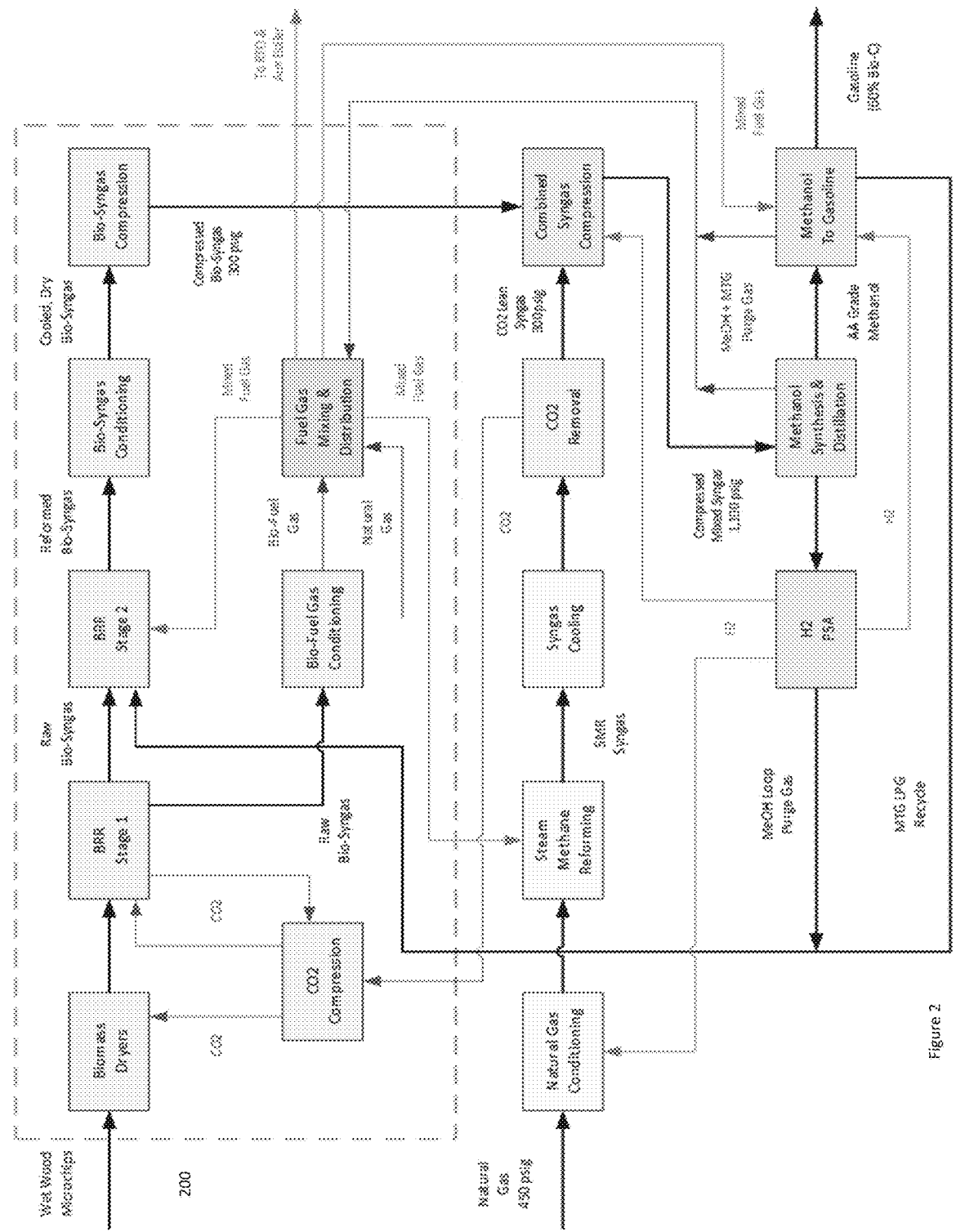
FIG. 2 illustrates a diagram of an embodiment of another flexible option for utilizing the second stage of the bio-reforming reactor and using its chemical grade bio syngas for fuel trains that produce fuel products having a biogenic content of between 50% and 100%.

FIG. 2 illustrates a diagram of an embodiment of another flexible option for utilizing the second stage of the BRR and using its chemical grade bio syngas for fuel trains that produce fuel products having a biogenic content of between 50% and 100%. Features of the integrated plant 200 shared with the integrated plant 100 will be similar except as noted and such features for the integrated plant 100 will apply to the integrated plant 200 as well.

The CO2 gas recirculation loop still cooperates with a CO2 separation unit to supply a fraction of the CO2 that is removed from the chemical grade bio-syngas coming out of the second stage to supply CO2 to the biomass feed system to the first stage of the bio-reforming reactor. The CO2 is supplied to both i) lock-hoppers connecting to the one or more feed supply inputs of the first stage and ii) the biomass dryers connecting to the lock hoppers in order for the chemical grade syngas produced from the reactor output of the tubular chemical reactor of the second stage. The fuel gas mixing and distribution unit still distributes fuel gases from purge gases to various heaters in the plant. The hydrogen pressure swing absorber is still used to recover hydrogen from purge gases. The SMR still produces hydrogen rich syngas to be mixed at an input to a fuel train.

However, a recycle loop rich in renewable carbons, including LPG, is used to supply recycled carbon based gases as feedstock into the tubular reactor of the second stage to conserve biogenic carbon and reduce the load on the SMR.

In the second stage of the BRR, i) raw bio-syngas is mixed with ii) carbon rich purge gases from the methanol loop and iii) liquefied petroleum gas (LPG) from the MTG section as chemical feedstock and then the second stage uses the catalyst for tar conversion and C1-C4 reforming to produce bio-C rich syngas.

The methanol loop has a hydrogen pressure swing absorber that is configured to separate out hydrogen gas from the purge gas of the downstream methanol-synthesis-reactor train. The hydrogen pressure swing absorber sends the renewable carbon based gases including CO and CO2 via the recycle loop to an input of the second stage of the bio-reforming reactor.

The tubular chemical reactor is configured to receive the purge gas that is recycled back via the recycle loop as a chemical feedstock from the downstream methanol-synthesis-reactor train as well as receive liquefied petroleum gas (LPG) from the downstream methanol-to-gasoline reactor train as a chemical feedstock via the recycle loop.

The tubular reactor still operates at 700 degrees C. or greater with catalyst but this tubular reactor has additional tubes to reform the recycled carbon rich gases.

Next, purge gas from the MTG is used as fuel gas in addition to the other sources discussed in FIG. 1. The fuel gas mixing and distribution unit has a natural gas input to receive natural gas, in addition to a purge gas input to receive purge gases from both the methanol-to-gasoline reactor train and the methanol-synthesis-reactor train, and in addition to a syngas input to receive the raw syngas from the reactor output of the first stage. The fuel gas mixing and distribution unit is also then configured to distribute fuel gas to at least heaters in the tubular chemical reactor of the second stage, heaters in the SMR, heaters in the Methanol-to-Gasoline train and then other plant components.

In an embodiment, the methanol-synthesis-reactor train receives feedstock from three sources. A hydrogen recirculation feedback loop is configured to recover hydrogen gas from purge gas from the downstream methanol-synthesis-reactor train. This recovered hydrogen gas is to be combined with the chemical grade bio-syngas supplied from the tubular chemical reactor and a hydrogen rich syngas stream from a steam methane reformer in order to control a methanol feed modulus ratio for a hydrogen to carbon monoxide ratio needed for methanol synthesis. The downstream methanol-synthesis-reactor train is configured to take in the chemical grade bio-syngas, extracted hydrogen, and SMR hydrogen rich syngas as a chemical feedstock to generate methanol. The hydrogen pressure swing absorber separates out the hydrogen gas from the purge gas from the methanol-synthesis-reactor train in order to recover the hydrogen gas from the purge gas. Any subsequent gasoline produced from the methanol-to-gasoline reactor train has a biogenic carbon content between 50% and 100%.

In an embodiment, the methanol-synthesis-reactor train receives feedstock from three sources. A hydrogen recirculation feedback loop is configured to recover hydrogen gas from purge gas from the downstream methanol-synthesis-reactor train to be combined with the chemical grade bio-syngas supplied from the tubular chemical reactor and a hydrogen rich syngas stream from a steam methane reformer in order to control a methanol feed modulus ratio for a hydrogen to carbon monoxide ratio needed for methanol synthesis. The downstream methanol-synthesis-reactor train is configured to take in the chemical grade bio-syngas, extracted hydrogen, and SMR hydrogen rich syngas as a chemical feedstock to generate methanol. The hydrogen pressure swing absorber separates out the hydrogen gas from the purge gas from the methanol-synthesis-reactor train in order to recover the hydrogen gas from the purge gas. Any subsequent gasoline produced from the methanol-to-gasoline reactor train has a biogenic carbon content between 50% and 100%.

The hydrogen pressure swing absorber is configured to also send hydrogen gas to the methanol-to-gasoline reactor train to change any ratios of produced gasoline to get a desired octane rating needed for commercial gasoline. The gasoline that is produced from the biomass, such as wood chips, has a biogenic carbon content between 50% and 100%.

Again, a high temperature Fischer-Tropsch reactor train could receive these same inputs and replace the methanol synthesis train and methanol to gas train in the integrated plant. The resulting fuel products could include diesel fuel, jet fuel, syncrude, etc.

As such, FIG. 2 shows an integrated plant 200 in which:
the plant uses biomass and natural gas as process feeds.
carbon rich gases are recycled to BRR Stage 2 to reduce load on the SMR.
Raw bio-syngas is generated by BRR Stage 1.
Raw bio-syngas for methanol production is mixed with methanol loop purge gas and LPG from the MTG section and directed to BRR Stage 2 for tar conversion and $C_1$-$C_4$ reforming to produce bio-C rich syngas.
A fraction of the raw bio-syngas from BRR Stage 1 is used as fuel gas.
A SMR is used to convert natural gas to syngas.
A fraction of the $CO_2$ is removed from the SMR syngas to supply $CO_2$ to the BRR lock-hoppers and biomass dryers. If necessary, more syngas $CO_2$ is removed to satisfy a minimum methanol modulus ratio for the combined syngas feed to the methanol synthesis loop.
A hydrogen PSA unit recovers hydrogen from a fraction of the methanol loop purge gas to provide local control of the methanol loop feed modulus.
Hydrogen PSA tail gas plus the LPG from the MTG section are recycled to BRR Stage 2.
Natural gas, bio-fuel gas and methanol/MTG purge gases are used as fuel gas to fire BRR Stage 2, the SMR furnace, MTG fired heaters, the auxiliary boiler and the RTO.
All electricity is imported.
This configuration can be used to maximize gasoline production while meeting a minimum life-cycle greenhouse gas reduction. The ability to produce gasoline from natural gas decreases revenue risk during start-up of the BTS section. By recycling carbon rich gases from the methanol loop and MTG section to BRR Stage 2, the design capacity of the SMR can be reduced to minimize capital costs.

Figure 3:
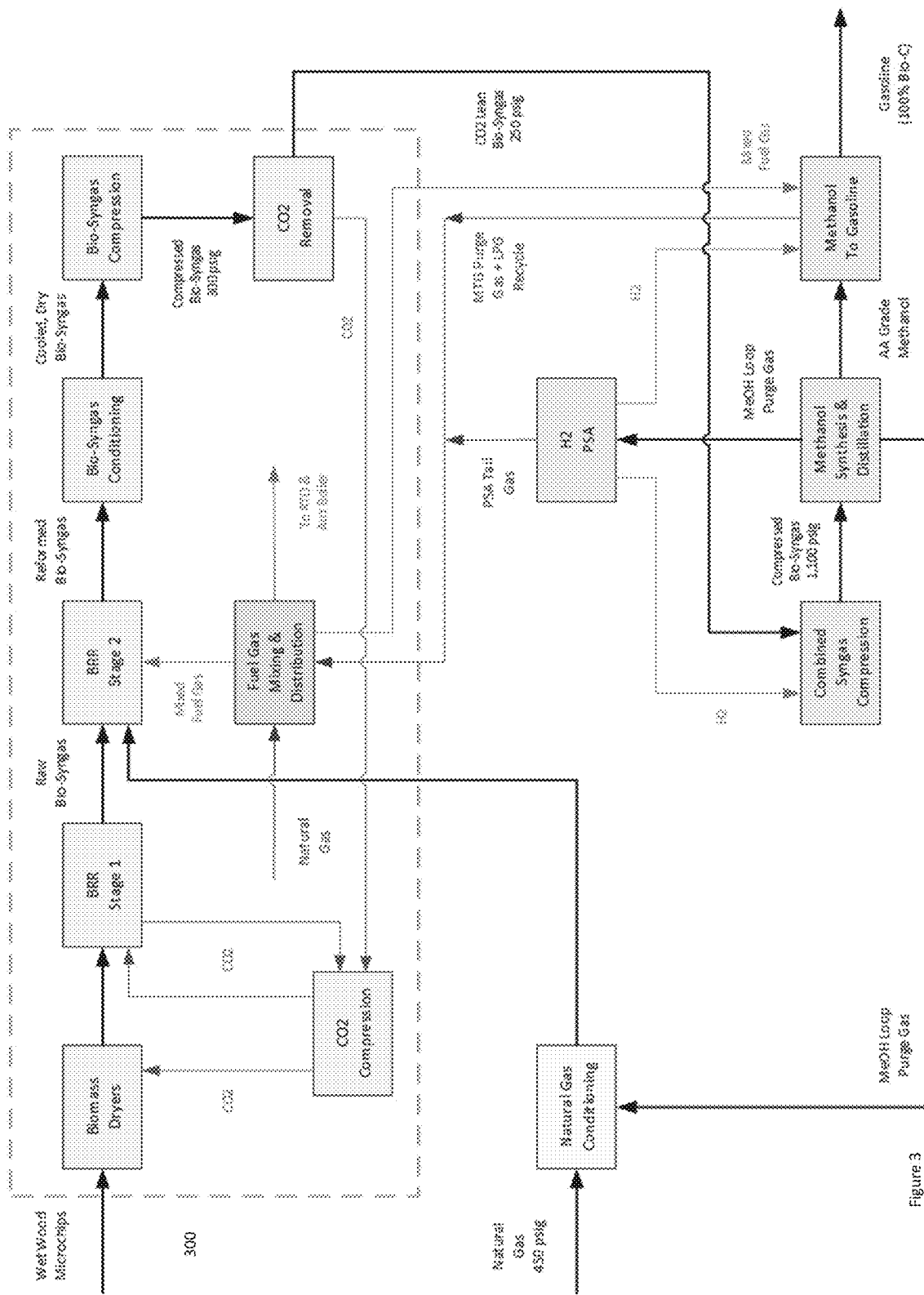
FIG. 3 illustrates a diagram of an embodiment where all three 1) raw syngas, 2) natural gas, and 3) recycled gases rich in biogenic carbon are used as chemical feedstocks and reformed within the tubular reactor of the second stage.

FIG. 3 illustrates a diagram of an embodiment where all three 1) raw syngas, 2) natural gas, and 3) recycled gases rich in biogenic carbon are used as chemical feedstocks and reformed within the tubular reactor of the second stage.

Features of the integrated plant 300 shared with the integrated plant 100 will be similar except as noted and such features for the integrated plant 100 will apply to the integrated plant 300 as well.

However, in the integrated plant of FIG. 3, biomass wood chips and natural gas are fed as chemical feedstocks into the second stage. The plant uses these process feeds without a SMR. FIG. 3 shows how i) natural gas ii) recycled gas, and iii) bio-syngas are reformed the second stage of the BRR Stage.

The tubular chemical reactor of the second stage can be configured to operate as a multi-purpose reformer to concurrently process i) natural gas with recycled process gases from the downstream fuel train coming from a first purge gas recycle loop. The natural gas with recycled process gases are reformed in a first set of tubes, in conjunction with ii) the raw syngas from the reactor output of the first stage being cracked and reformed in a second set of tubes.

The tubular chemical reactor of the second stage has two or more inputs configured to receive the chemical feedstock from both i) a first input to receive the raw syngas from the output of the reactor into a first set of tubes of the tubular chemical reactor and ii) a second input connected to a second set of tubes of the tubular chemical reactor to receive both 1) the purge gas from the methanol-synthesis-reactor train that is recycled back to the tubular chemical reactor of the bio reforming reactor to recover any hydrogen and carbon-based purge gases as well as 2) natural gas, and then convert all of them into the chemical grade bio-syngas produced by the reactor output of the tubular chemical reactor of the second stage.

Thus, the tubular chemical reactor receives a supplemental amount of natural gas as chemical feedstock in stage 2, plus recycled purge gas from the downstream methanol-synthesis-reactor train.

The syngas combiner and compression unit is configured to receive chemical feedstock gas from merely both i) the chemical grade bio-syngas produced by the second stage and ii) the hydrogen from the hydrogen pressure swing absorber, to locally control a feed modulus ratio for a hydrogen to carbon monoxide ratio needed for methanol synthesis. No separate SMR gases are needed.

Next, the second stage includes heaters for the tubular chemical reactor of the second stage to maintain an operating temperature of that reactor of at least 700 degree C. A fuel gas mixing and distribution component is configured to receive fuel gas from a number of sources including a tail gas from a hydrogen pressure swing absorber from the downstream methanol-synthesis-reactor train as well as unused process gases including liquefied petroleum gas (LPG) from the methanol-to-gasoline train. The fuel gas mixing and distribution component distributes that fuel gas via a fuel gas feedback loop of hydrogen and/or carbon-based gases that connect to at least i) the heaters for the tubes of the tubular chemical reactor in order to crack the tars and reform the light hydrocarbons as well as ii) to heaters in the methanol-to-gasoline train. The downstream methanol-to-gasoline train is configured to produce fuel products with 50-100% biogenic carbon content.

As such, FIG. 3 shows an integrated plant 300 in which:
Raw bio-syngas is generated by BRR Stage 1.
Natural gas is desulfurized and mixed with methanol loop purge gas (a fraction of the loop purge gas is used as a hydrogen source for the natural gas desulfurization). The natural gas and recycle gas are combined with bio-syngas and sent to BRR Stage 2 for tar conversion and $C_1$-$C_4$ reforming to produce syngas for the methanol synthesis loop.
A fraction of the $CO_2$ is removed from the combined syngas to supply $CO_2$ to the BRR lock-hoppers and biomass dryers.
A hydrogen PSA is used to recover hydrogen from methanol loop purge gas to locally control the methanol loop feed modulus and provide hydrogen to the MTG process. The PSA tail gas is used as fuel gas.
Natural gas, PSA tail gas, MTG purge gas and LPG are used as fuel gas to fire BRR Stage 2, MTG fired heaters, the auxiliary boiler and the RTO.
All electricity is imported.
This configuration uses BRR Stage 2 to reform raw bio-syngas mixed with natural gas and methanol loop purge gas. A natural gas SMR is not required and there will be greater economy of scale on the BRR Stage 2 furnaces, reducing the capital costs.

The following drawings and text describe additional aspects of different embodiments of the design.

Figure 4:
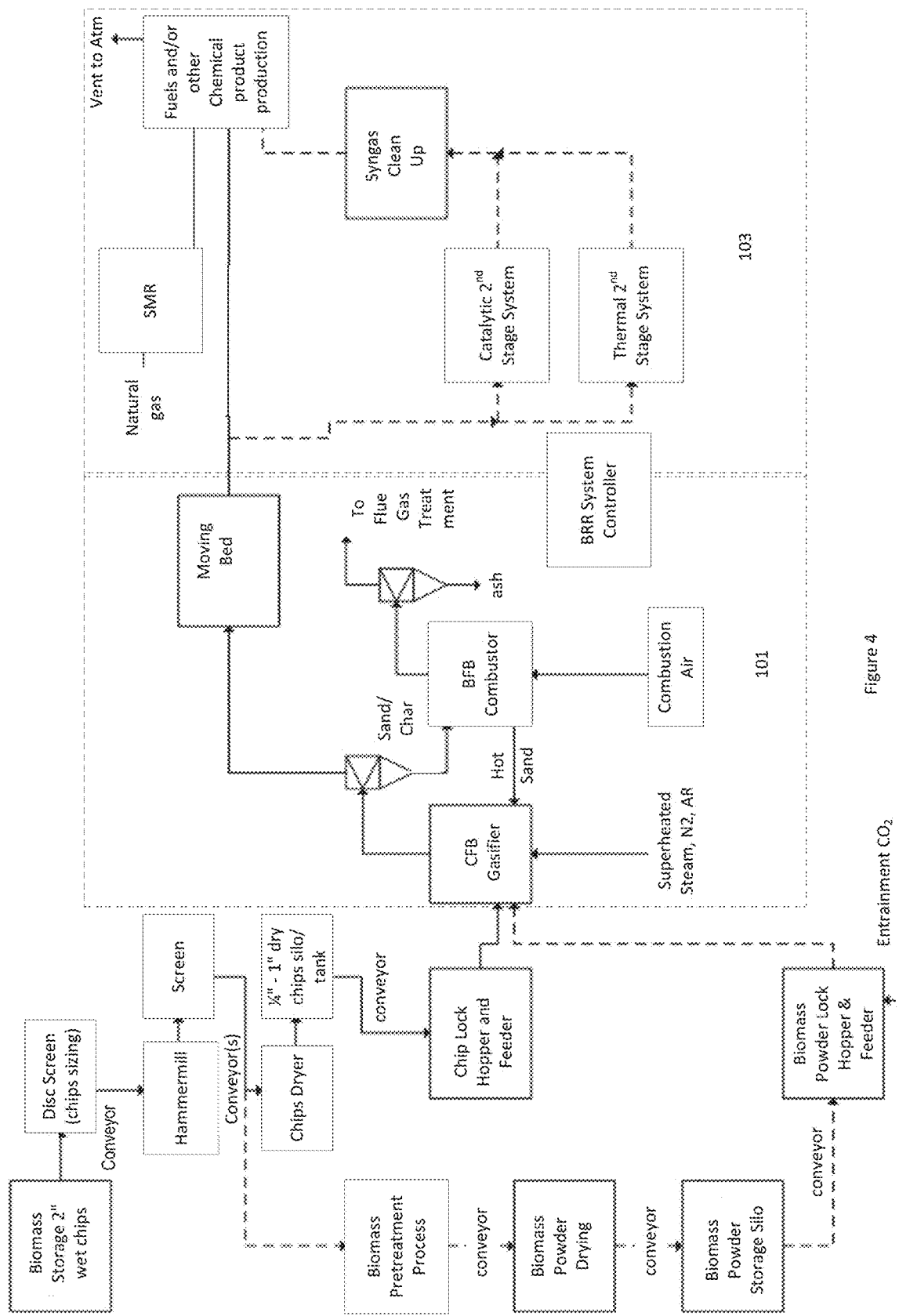
FIG. 4 illustrates a diagram of an embodiment of integrated plant with an interconnected set of two or more stages of reactors to form a bio-reforming reactor that generates syngas.

FIG. 4 illustrates a diagram of an embodiment of integrated plant with an interconnected set of two or more stages of reactors to form a bio-reforming reactor that generates syngas.

The integrated plant may have an interconnected set of two or more stages 101, 103 of reactors. An example first stage reactor 101 is meant to cause the devolatilization of woody biomass into its constituent gases, tars, chars, ash, and other components. Devolatilization of woody biomass occurs by chemically bio-reforming or decomposing the biomass via a gasification of a steam-based reaction where the steam, as the oxidant, at a given temperature chemically decomposes the complex chains of molecules of the biomass into smaller molecules composed of 1) solids, such as char (unreacted carbon and ash), as well as 2) gases, such as hydrogen (H2), carbon monoxide (CO), carbon dioxide CO2, methane (CH4), etc. Thus, a decomposition reaction of the biomass through steam gasification occurs chemically, which may be referred to as bio-reforming. The second stage 103 of the reactor is meant to perform further clean-up of the syngas to make the raw syngas from the first stage 101 into chemical grade syngas by further cracking the tars and/or excess methane into their constituent molecules so that the resultant syngas stream can be used in other chemical reactions rather than just being a source of fuel for burning.

The integrated plant starting from biomass (dried or not dried) may feed a two-stage bio-reforming reactor (BRR) 101, 103. The bio-reforming reactor produces a chemical grade syngas to produce fuels or other chemicals such as Methanol (MEOH), Methanol-to-Gasoline (MTG), High Temperature Fischer Tropsch process (HTFT), Low Temperature Fischer Tropsch process (LTFT), etc. A Steam Methane Reactor may or may not be included with the integrated plant in order to supply extra hydrogen when combined with the syngas from the bio-reforming reactor. Biomass could be any non-food source biomass such as wood, sugarcane, bamboo, sawgrass, bagasse, palm empty fruit basket, corn stover, etc. In an embodiment, a low sulfur content woody biomass is chosen as the source biomass. In an embodiment, a combination of these biomass sources is chosen as can be supplied locally to the integrated plant.

The biomass feed system is configured to supply the biomass to one or more supply inputs into the circulating fluidized bed reactor in the first stage 101. The biomass feed system further includes any of 1) a rotary valve associated with a pressurized lock hopper system, 2) a rotary valve from a non-pressurized hopper, 3) a screw feeder system, or 4) combination of the above. A variety of sizes of the biomass such as dimensions of small fine particles, less than 500 microns, and/or chunks, such as an ¾ inch or half-inch or ¼ inch long chip of wood, and chips such as 1-2 inches may be fed by the above variety of feeding mechanisms (e.g. a screw-type feeding mechanism, a lock hopper mechanism, etc.).

The biomass feed system supplies the biomass across a pressure boundary from atmospheric to above the operating pressure within the circulating fluidized bed reactor in the first stage 101. High pressure steam and gravity are used to supply the biomass through the one or more supply inputs across and out into the vessel of the circulating fluidized bed reactor to prevent backpressure on the biomass feed system and obtain better mixing throughout the vessel.

A first stage 101 of the bio-reforming reactor may include a circulating fluidized bed reactor that has one or more supply inputs to feed the biomass from the biomass feed system, one or more stream inputs to feed heat absorbing media, a vessel to circulate the heat absorbing media, and has a sparger to input steam. The heat absorbing media may include silica sand, ilmenite, olivine, dolomite, zeolite catalysts, and any combination of the five. In general, the biomass, steam, and heat absorbing media circulate in the vessel/fluidized bed of the reactor. The first stage 101 is configured to cause a chemical devolatilization of the biomass into its reaction products of constituent gases, tars, chars, and other components, which exit through a reactor output from the first stage 101.

The first stage 101 includes the circulating fluidized bed reactor coupled with a char combustor. Hot heat absorbing media for fluidization (e.g. the silica sand or olivine) may be circulated between the circulating fluidized bed gasifier and the char combustor, providing most of the necessary heat to gasify the incoming biomass and utilizing the char produced in the circulating fluidized bed reactor. The char combustor could be a bubbling fluidized bed or as a circulating fluidized bed (riser configuration). The char combustor is configured to heat and supply the circulating heat absorbing media to the one or more stream inputs into the circulating fluidized bed reactor. The reactor output from the first stage 101 couples to a primary cyclone and dipleg that has an outlet to the bubbling fluidized bed char combustor. The char combustor may or may not have supplemental fuel added in the form of natural gas, propane, fuel gas, torch oil, kerosene, or additional biomass. The operating temperature of the char combustor will be about 100-150 C above the temperature of the circulating fluidized bed reformer. The char combustor will have an outlet (return to the circulating fluidized bed reformer) for the circulating media either through a first stage 101 cyclone in the case of the circulating fluidized bed combustor or an overflow (or underflow) port to a standpipe in the case of the bubbling bed combustor configuration.

The second stage reactor 103 of the bio-reforming reactor may contain a radiant heat reactor that either 1) operates at a high enough temperature such that no catalyst is needed to decompose the tars and excess methane in the syngas stream or 2) operates with a catalyst at a lower temperature and then occasionally rejuvenates the catalyst in the second stage 103.

The second stage 103 of the bio-reforming reactor has an input configured to receive a stream of some of the reaction products that includes 1) the constituent gases and 2) at least some of the tars as raw syngas, and then chemically reacts the raw syngas within a vessel of the second stage 103 to make the raw syngas from the first stage 101 into a chemical grade syngas by further cracking the tars, excess methane, or both into their constituent molecules so that a resultant syngas stream going out a reactor output of the second stage 103 can be used in other chemical reactions rather than just being a source of fuel for burning.

In an embodiment, the catalytic reactor in the second stage 103 removes a substantial amount of tars and methane remaining in the raw syngas. The catalytic reactor reacts with the raw syngas to create a resultant chemical grade synthesis gas that is substantially tar-free, (less than 100 ppm total tars including benzene and naphthalene and more likely less than 5 ppm) and with a methane content as low as 0.5% (dry basis) and certainly no higher than 10% (dry basis).

Going back to stage 1, a candle filter or moving bed may be an exit component from stage 1 or an entry component into stage 2. The syngas from stage 1 may be sent to either a candle filter, which could operate as high as 900 C; a secondary cyclone for dust removal; or to a packed or moving bed of, for example, olivine, ilmenite, or dolomite, which could act as both a filter and a tar destroyer. If syngas from stage 1 goes through the candle filter, the integrated plant may still pass syngas to the olivine or dolomite bed for tar destruction.

The interconnected set of two or more stages of reactors 101, 103 form a bio-reforming reactor that generates syngas for any of 1) a methanol synthesis reactor, 2) a Methanol-to-Gasoline reactor train process, 3) a low temperature Fischer-Tropsch reactor train, 4) another transportation fuel process, and 5) any combination of these, that use syngas derived from biomass in the bio-reforming reactor.

Figure 5:
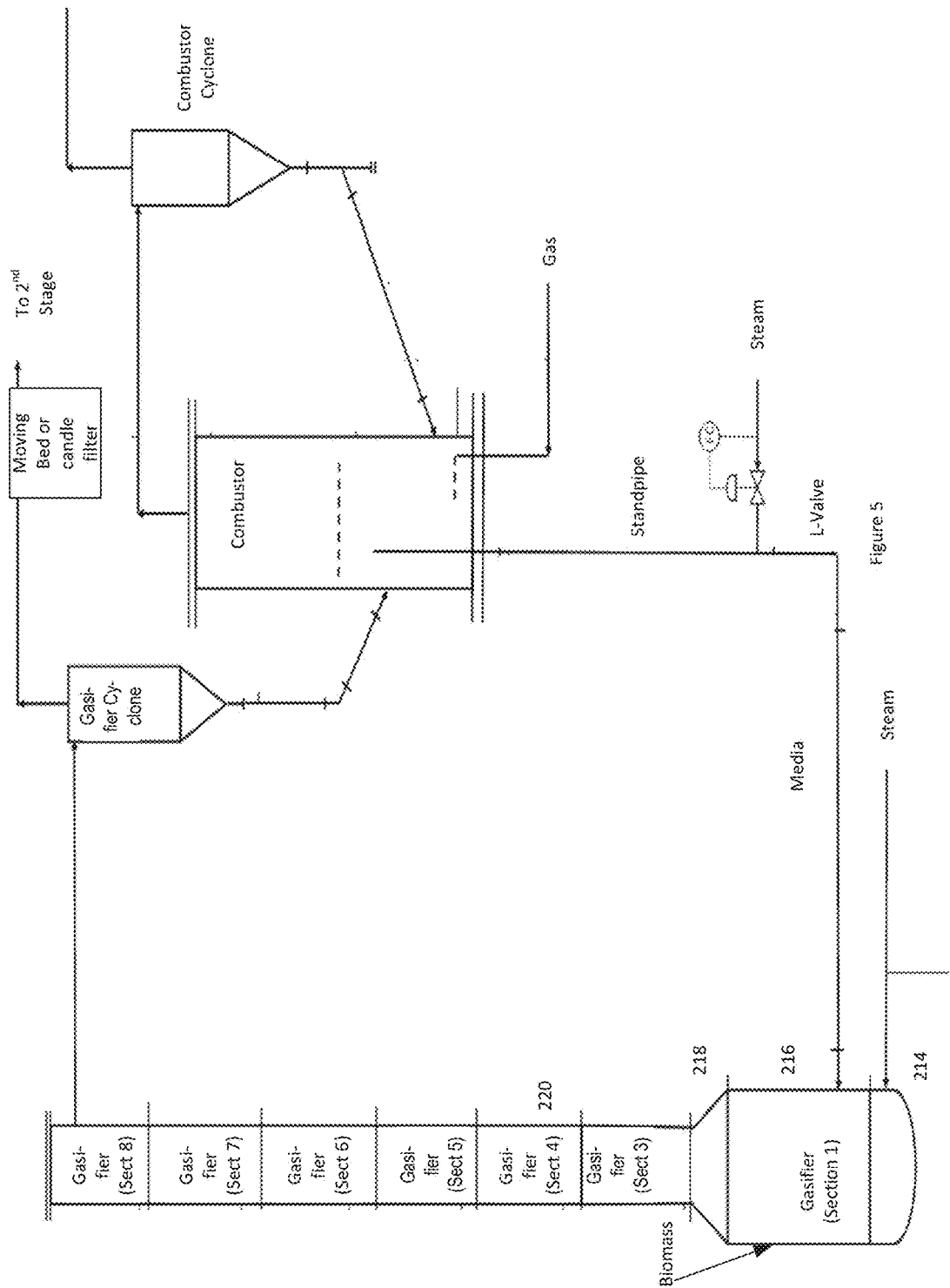
FIG. 5 illustrates a diagram of an embodiment of the first stage reactor including the circulating fluidized bed reactor coupled with a char combustor.

FIG. 5 illustrates a diagram of an embodiment of the first stage reactor including the circulating fluidized bed reactor coupled with a char combustor.

The circulating fluidized bed reactor has multiple sections forming a shape and an operation of the circulating fluidized bed reactor. The circulating fluidized bed reactor may have a bottom section 214 and a mixing pot section 216 of the vessel that are cylindrical in shape. The mixing pot section 216 then comes up to a necking portion 218 of the vessel that is smaller in diameter than the mixing pot section 216. The necking portion 218 then goes to a top riser section 220, which includes the reactor output of the first stage. In an embodiment, the cylindrical shaped bottom section 214 of the vessel to the necking portion 218 forms a mixing pot section 216 with circumference and/or width dimensions that are substantially greater than the circumference of the riser section 220. The bottom section 214 has the sparger to distribute high-temperature and high-pressure steam in the circulating fluidized bed reactor. The sparger is located at or near the bottom of the vessel. The high-temperature and high-pressure steam from the sparger may supply some of the energy needed to decompose the biomass as well as create an upward force to carry the biomass and circulating heat-absorbing media up through the vessel.

In an embodiment, the sparger cooperates with an associated bubble breaker, such as cross hatched metal, to make smaller bubbles of gas to better carry the solids of the circulating media and biomass upward. The bubble breakers also prevent slugging and provide smoother circulation.

The one or more supply inputs feed the biomass chunks and/or particles at a higher pressure than in the vessel in order to distribute the biomass downward and across the vessel. The higher injection pressure and gravity cause the biomass chunks to be injected in the vessel. As a counter force, the steam from the sparger, superheated fluidization gases (steam, N2, Argon), and a stream of the heat absorbing media from the one or more stream inputs both gasify and push up falling chunks and particles of the biomass upward and in a radial direction in the vessel. The velocity of the steam, media, and gases as well as the pressure pushes up the falling chunks and particles of biomass upward into the circulating fluidized bed reactor vessel. Using the latent heat provided by the steam, media, and gases, the biomass is converted to syngas by a decomposition reaction with steam as the chunks or particles of biomass rise in the circulating fluidized bed gasifier. The high temperature and high-pressure of the steam and the heat absorbing media starts the devolatizing of the biomass, which causes localized turbulent flow of gases around each biomass chunk. The turbulent flow of gases creates better mixing and better reaction with the injected biomass.

The circulating fluidized bed may have different velocities flowing through the vessel, which also causes a good amount of turbulence for the biomass flowing with the circulating solid media. The velocity of the biomass flowing increases as the size of the chunk of biomass decreases via the decomposition of its larger complex molecules into smaller solid molecules and gaseous molecules. The devolatilization and decomposition of the biomass substantially increases the gas volume and therefore gas velocity of the system.

In an embodiment, the velocity flow of the biomass and/or heat absorbing media in the bottom section 216 is 2-3 feet/second. The velocity flow of the biomass and/or heat absorbing media in the mixing pot section 216 is between 2-6 feet/second in the circulating fluidized bed reactor based on a shape and dimensions of the vessel. The velocity flow of the biomass and its devolatilized gases and solids at a start of the necking transition section is up to 5-10 feet per second based on the shape and dimensions of the vessel in this section. The velocity flow of the biomass and its devolatilized gases and solids at the start of the necking transition section may be, for example, 6 feet per second. The velocity flow of the biomass and its devolatilized gases and solids within the riser section 220 speeds up to 10-20 feet per second. The velocity flow of the biomass and its devolatilized gases and solids at an exit of the riser section 220 is greater than 15 feet per second, and typically 20 feet per second, based on the shape and dimensions of the vessel in this section.

The velocity flows in the riser section 220 have a residence time of 1-2 seconds do to a rate of the velocity flow of the biomass and its devolatilized gases and solids, and the heat absorbing media; and, the designed dimensions and shape of the riser section 220. The lower velocities and bigger volume of the mixing pot section 216 allow for an on average residence time of 2-3 seconds within the mixing pot section 216 do to a rate of the velocity flow of the biomass and its devolatilized gases and solids, and the heat absorbing media; and, the designed dimensions and shape of the mixing pot section 216. This residence time is significantly longer than prior techniques. The longer residence time creates better mixing of the chunks of biomass with the circulating media to chemically react and decompose the biomass into its constituent solids and gases. Additionally, some chemical reactions need a longer chemical reaction time to assist in the prevention of forming of certain tars. Also, the longer residence time assists in increasing the yield of fully converting the woody biomass into its constituent solids, such as C (ash), and gases such as CO, CO2, CH4, and H2.

The angular necking section 218 of the circulating fluidized bed reactor reflects and turns some of the heat absorbing media, gases, and not fully-decomposed solid biomass on outside edges of the necking section 218 back down into the circulating fluidized bed in the mixing pot section 216, which causes more turbulence as well as a better distribution of the biomass inside the vessel. Note, an angle of the necking section 218 from the mixing pot section 216 to the riser section 220 controls an amount of turbulence with the reflected back heat absorbing media, gases, and not fully decomposed solid biomass into the mixing pot section 216 portion of the vessel. The more turbulence the better the mixing of the heat absorbing media and biomass, as well as a better distribution of the biomass throughout all of the circulating media in the lower portions of the circulating fluidized bed reactor vessel. The ratio of circulating media to biomass feed will be, for example, on the order of 20:1 up to 60:1 depending on operating objectives (desired reaction temperature, product slate, type and moisture content of biomass, temperature of incoming sand or olivine, etc.).

Figure 6:
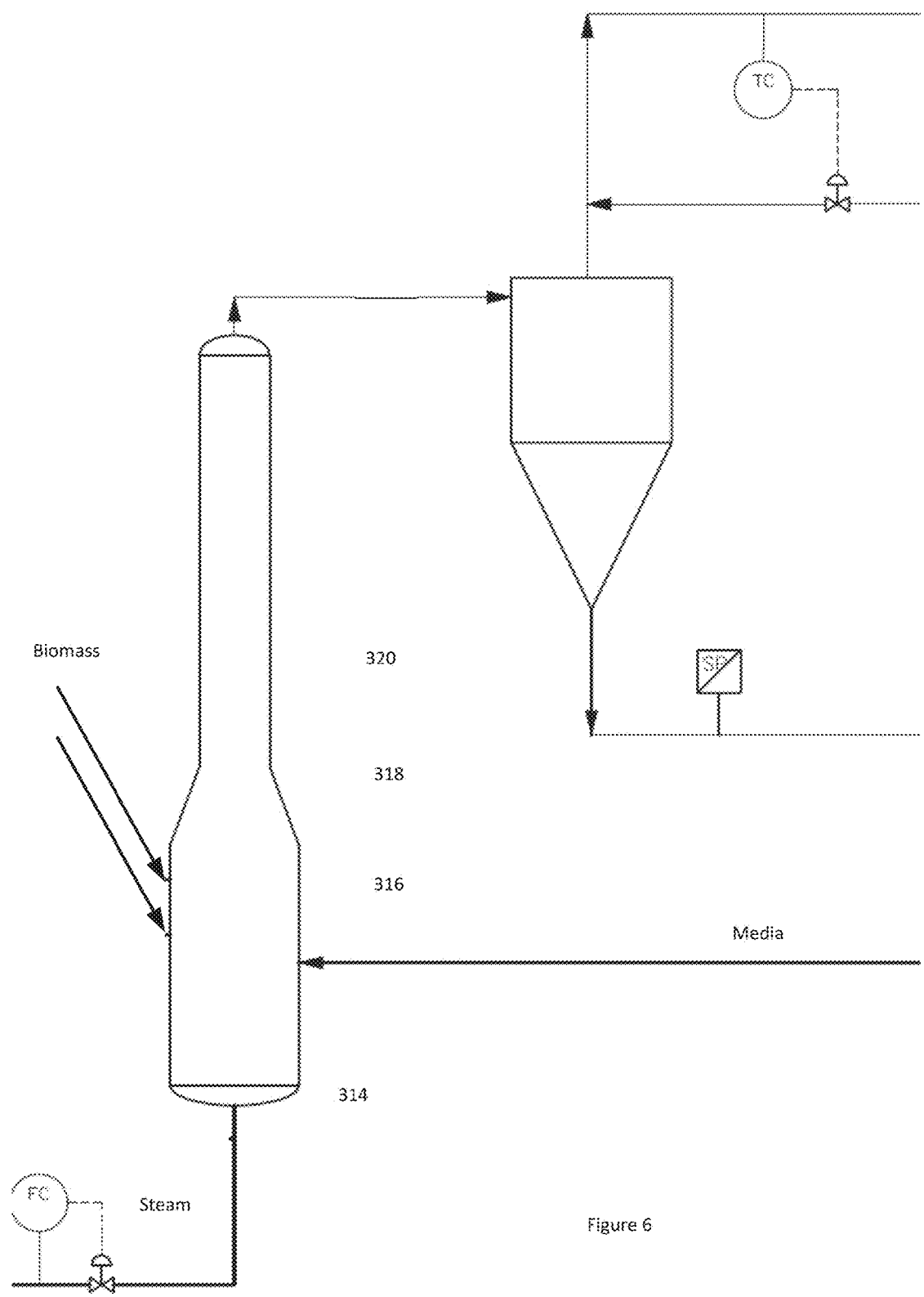
FIG. 6 illustrates a diagram of an embodiment of the circulating fluidized bed reactor having multiple sections that form a shape and an operation of the circulating fluidized bed reactor.

Note, example different shapes and angles of the vessel of the reactor are shown in FIGS. 5 and 6. The shown shapes and angles of the CFB reactor in FIGS. 5 and 6 are examples of the types of shapes and angles associated with portions of the vessel.

As discussed, the circulating fluidized bed reformer may have lower velocities at the bottom section 214 of the reactor, near the feed inlet, provided primarily by steam (and perhaps supplemental recycled syngas or CO2) and will quickly rise as the woody biomass reacts and/or changes are made to the reactor diameter. The circulating fluidized bed reformer also may or may not contain internals intended to help with smoother fluidization and better mixing of the incoming sand or olivine and biomass. In an embodiment, an internal portion of the vessel does have the one or more internal mixing baffles to assist with mixing of the heat absorbing media and biomass. Note, in the bubbling fluid bed version of the combustor internal mixing baffles may also be used.

As discussed, the circulating fluidized bed reactor has multiple sections forming a shape and an operation of the circulating fluidized bed reactor. The circulating fluidized bed gasifier has the sparger to distribute high-temperature and high-pressure steam in a bottom section 214 of the circulating fluidized bed reactor. The circulating fluidized bed reactor is configured to operate in a temperature regime from 750 degrees C. to 1000 C and an operating pressure is configured to be from 20 pounds per square inch up to 300 pounds per square inch with a typical value of 125 pounds per square inch. The steam and heated heat absorbing media create this operating temperature in the vessel, which can also be supplemented with an external heat source such as a gas-fired burner coupled to the vessel. The reason for the ranges of the operating conditions for the circulating fluidized bed reactor are biomass type, ash fusion temperature, yield patterns, and downstream performance requirements.

In another example embodiment, the superficial gas velocities in a top riser section 220 are configured to be greater than 19 feet/second based on a shape and dimensions in this section of the vessel while the velocities in a mixing pot section 216 will range from 2-6 feet/second based on a shape and dimensions in this section of the vessel. The mixing pot section 216 is located between the bottom section 214 and top riser section 220. The steam from any of 1) the sparger, 2) the stream inputs for the heat absorbing media, and 3) the supply inputs for the biomass combine to reform the biomass at total steam to biomass ratio ranging from 0.25:1 up to 1:1. The actual value will depend upon the biomass, its moisture content and operating objectives (yields, etc.). The steam and hot solid media reform the biomass in the circulating fluidized bed gasifier.

In the riser section 220, raw syngas including tars and methane, unreacted portions of solid biomass, ash from reacted portions of the biomass, and circulating media exit the riser section 220 of the circulating fluidized bed reactor.

The primary cyclone is coupled to the reactor output from the first stage in a riser section 220 of the circulating fluidized bed reactor. The top necking portion 218 of the circulating fluidized bed feeds into a top riser section 220 that then feeds into a primary cyclone that is very efficient, 99.99% efficiency at removing solid particles and pieces from the syngas. The primary cyclone is heavily loaded to operate at very high solids recovery efficiency in excess of 99%, and in most cases greater than 99.9%. In an embodiment, the cyclone has an efficiency 99.995%. The primary cyclone that is very efficient in separating solid particles including char and the solid circulating heat absorbing media routes the solid particles toward the char combustor. The primary cyclone also routes gases from the stream of the reaction products toward the input of the second stage of the bio-reforming reactor. Thus, the output of the top portion of the primary cyclone is raw syngas that is fed to the second stage. The output of the bottom portion of the primary cyclone is solid particles and pieces fed to the char combustor. Gravity pulls the solid particles and pieces, including heat absorbing media, ash, char, and other solids, down from the bottom of the primary cyclone through a loop seal into the char combustor.

Note, the char of the biomass, ash, and media (sand or olivine) stream is fed to the bubbling fluidized bed char combustor in order to regenerate and reheat the fluidization media.

Note, another type of combustor such as a circulating fluidized bed char combustor may be used. Also, another type of reactor may be used in the first stage such as a bubbling fluidized bed reactor, a radiant thermal reactor, a circulating fluidized bed reformer with a straight riser, or a fast-fluidized bed with a riser on top. Note, in an embodiment olivine is used as at least a portion of the heat absorbing media. The olivine material (specifically the Magnesium Oxide (MgO) in olivine) as heat absorbing media is for beneficial binding potassium out of the reaction products and minimizing clinker formation.

Note, tail/waste gases from other parts of the integrated plant, including methane from a downstream methanol stage if used, may be routed in a loop to the char combustor and used as supplemental fuel in the combustor to heat the heat absorbing media. The char and fuel gases are combusted to heat the heat absorbing media. Natural gas may be used as supplemental fuel in the combustor to provide the balance of gasification heat required. The combustor is operated at gas velocities that allow the smaller/lighter ash particles to be separated from the sand or olivine, and recovered in flue gas solids removal systems (downstream of the recycle combustor cyclone). Hot, regenerated sand or olivine is returned to the gasifier/circulating fluidized bed reactor via an L-valve.

In an embodiment of the circulating fluidized bed version of the combustor, a recycle cyclone is coupled to the char combustor and is configured to operate at less than maximal efficiency from as low as 75% and no higher than 99%. This is to ensure that a bulk of the heat absorbing media is returned to the char combustor but will allow the lighter ash particles to escape to the recycle cyclone where the ash particles are removed from the integrated plant. The recycle cyclone is the primary mode of exit for ash from the system (as well as attrited fines from the circulating media). The cyclone separator is a low efficiency cyclone separator that separates two solids such as the heavier circulation medium, such as sand or olivine, from the lighter particles of ash. In an embodiment of the bubbling fluidized bed version of the combustor, the cyclone will be extremely high efficiency—greater than 99.99%.

For the circulating fluid media loop with stage 1 of the BRR and the char combustor, the design may use properly designed devices such as L-valves and loop seals to ensure a desired circulation rate with safe operation.

The heat absorbing circulating media could be silica-based sand, olivine, ilmenite, or mixtures thereof. The integrated plant may also put in other additives with the circulating media such as catalysts (to reduce the tar and other heavy hydrocarbon yield, increase approach to water-gas shift equilibrium, sulfur getters, and other additives to raise the melting points of the ash and media).

FIG. 6 illustrates a diagram of an embodiment of the circulating fluidized bed reactor having multiple sections that form a shape and an operation of the circulating fluidized bed reactor.

The circulating fluidized bed reactor has multiple sections 314-320 forming a shape and an operation of the circulating fluidized bed reactor. The circulating fluidized bed reactor may have a bottom section 314 and a mixing pot section 316 of the vessel that are cylindrical in shape. The mixing pot section 316 then comes up to a necking portion 318 of the vessel that is smaller in diameter than the mixing pot section 316. The necking portion 318 then goes to a top riser section 320, which includes the reactor output of the first stage, of the circulating fluidized bed reactor. The bottom section 314 has the sparger to distribute high-temperature and high-pressure steam in the circulating fluidized bed reactor. The sparger supplying steam is located at or near the bottom section 314 of the vessel.

The bottom section 314 of the vessel and the mixing pot section 316 of the vessel have width dimensions that are substantially greater than a circumference of the riser section 320. The circulating fluidized bed has different velocities flowing through the vessel in the multiple sections, which causes turbulence for the biomass flowing with the circulating solid media. The sparger at the section 314 of the vessel injects high-pressure steam at a velocity of about 2 feet/second and the high-pressure steam is between 50 to 300 pounds per square inch.

The supply inputs to feed biomass are located in the mixing pot section 316 to feed the biomass toward the bottom of the vessel, where the biomass is mixed with superheated fluidization gases and heat absorbing media. The feed point of the supply inputs to feed biomass is far enough from the bottom section 314 of the vessel to ensure the biomass readily falls from the supply inputs into the vessel from a great enough height that the biomass cannot get close to physically building up from the bottom to block the entering biomass; and thus, a location of the feed point of the supply inputs in the vessel eliminates a need to have a seal in the supply inputs against solid biomass back flow. The design may have at least 3 foot drop on the gas feed line to taps/aeration points and also the gasifier/reactor and the char combustor plenums. This 3 foot rise is a very effective seal against solid back flow. This drop and rise varies with specific size and geometry of vessel.

The circulating fluidized bed reactor/biomass gasifier may be lined with refractory materials of both soft and hard refractory materials such as 2 inches of soft refractory insulation and 2 inches of hard refractory insulation. In an embodiment, the thickness of the hard face refractory insulation is adjusted to fit into nominal pipe and vessel size requirements. In another embodiment, what governs the refractory thickness and fit is the need to control temperature of the chosen metallurgy, erosion and chemical resistance of the refractory, etc.

Figure 7:
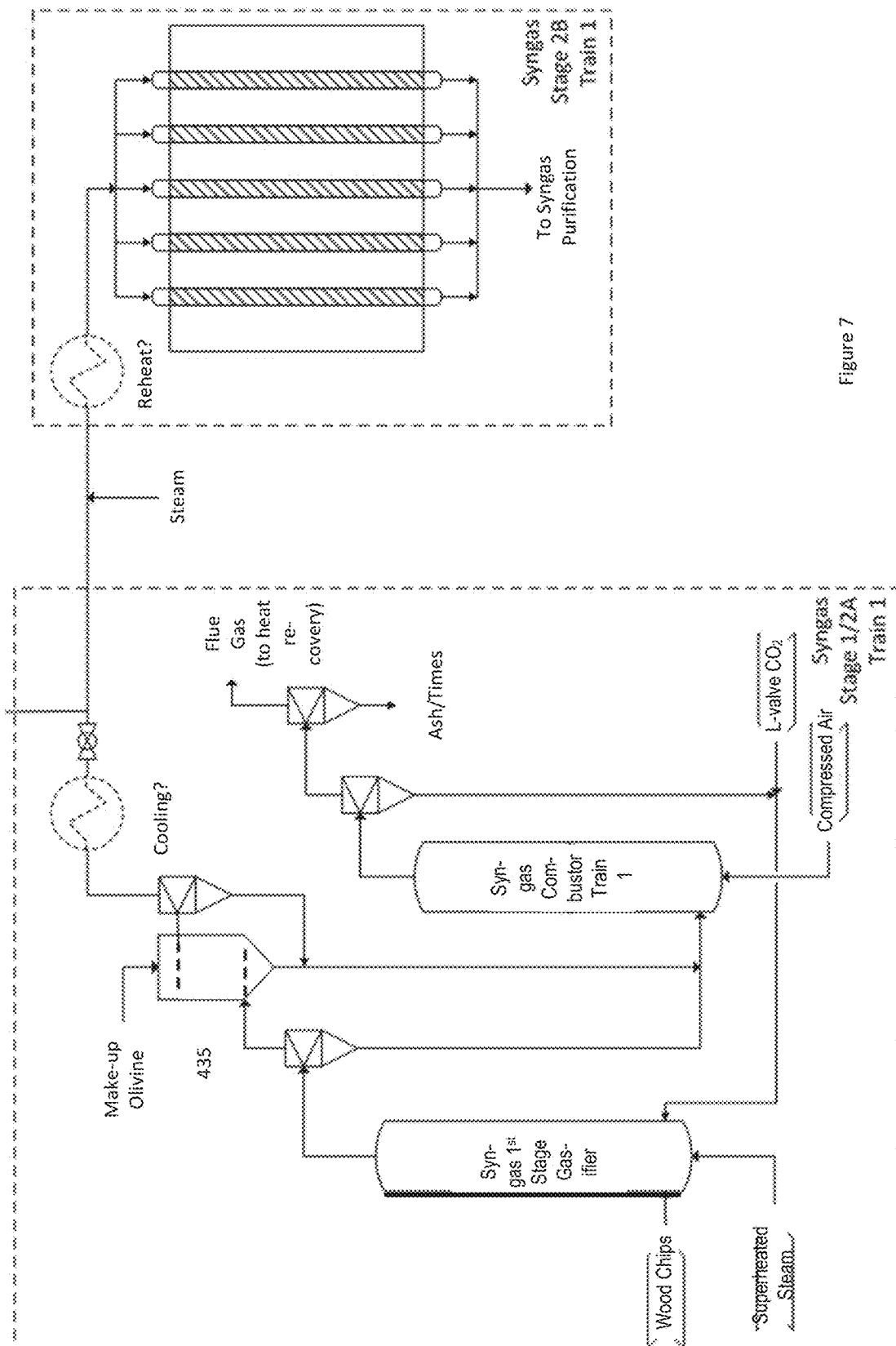
FIG. 7 illustrates a diagram of an embodiment of a densely packed moving bed coupled to the reactor in the first stage via the primary cyclone.

FIG. 7 illustrates a diagram of an embodiment of a densely packed moving bed coupled to the reactor in the first stage via the primary cyclone.

The densely packed moving bed 435 may be made of olivine, ilmenite, or dolomite that is similar in composition to circulating heat absorbing media. The densely packed moving bed 435 is configured to act as both a dust filter and a tar destroyer from the raw syngas stream coming out from the reactor output of the first stage. The densely packed moving bed 435 is coupled to a gaseous output of the primary cyclone coupled to the reactor output of the first stage. The tar destruction bed could operate adiabatically at 900 C (temperature could drop to 800-850 C) or isothermally with a mechanism for heating the bed—e.g. via a furnace or some oxygen addition. In an embodiment, the moving bed 435 is configured to operate adiabatically at 800 C to 950 C temperature. Tars heavier than benzene are chemically broken down into constituent gases in the raw syngas in the densely packed moving bed 435 in order to protect any downstream components from coating with soot.

In general, olivine is active for tar conversion at the decomposition and decomposition conditions present. Olivine is generally used in the gasifier as heat absorbing media, due to its attrition resistance; however, it can also be applied separately downstream of the gasifier in the moving packed bed form as a guard bed/tar converter. Olivine performance for tar cracking activities can be very effective at these conditions. Regeneration of the Olivine packed moving bed 435 is accomplished by flowing the moving packed bed of Olivine with its collected dust and heavy tar residue into the packed bed of olivine and then into the char combustor to be joined and heated with the rest of the circulating olivine in the char combustor. In an embodiment, conversions—tars (heavier than benzene) may be 25-65%; benzene conversion may be 90%; light hydrocarbons conversion may be 0%; and methane conversion in the raw syngas may be 0%. Thus, the hot packed slow moving bed 435 of olivine is operated at about 900 degrees C. to chemically break down the heavy sooting tars, such as polyaromatic hydrocarbons tars, in the raw syngas from the gasifier/reactor in the first stage. The hot packed slow moving bed 435 of olivine, acts as a tar pre-reformer to substantially breaks down the heavy sooting tars to protect the downstream components from coating with soot.

Note, in order not to fluidize the moving bed, the apparent weight of the bed must exceed the pressure drop through the bed. Using an average olivine particle diameter of 550 microns, a GHSV (active bed length) of 3,000 $hr^{-1}$, and an L/D of 0.385 ft/ft, a pressure drop of 4.1 pounds per square inch is estimated. Therefore, in an embodiment, a minimum densely packed bed level of seven feet (ft) is required above the outlet gas collector in order to keep the densely packed moving bed 435 from fluidizing.

In an embodiment, the moving bed may draw circulating media from the char combustor to act as the feed source for the densely packed bed and could be fed by a loop to the make-up insertion input into the moving bed.

In an embodiment, once the syngas has been processed to remove a substantial amount of heavy tars in the integrated plant, and then the syngas will be sent to the stage 2 system for destruction of the remaining tars and conversion of a substantial amount of the methane to synthesis gas in a catalytic reactor. This catalytic reactor may be packed with supported metal catalysts active for methane reforming and tar destruction. Typical metal catalysts include nickel oxide, precious metals, etc. as catalysts. In an embodiment, the catalytic reactor in the second stage may operate at 850-900 C and have multiple tubes, each with the catalyst inside the vessel of the reactor while gas fired heaters supply heat for the chemical reactions inside the tubes. The reactor may be co-fed with sufficient superheated steam to increase the steam:carbon ratio of the catalytic reactor feed to, for example, 8 mol/mol. The syngas with light tars and methane enters the tubes with the catalyst and then this reforms the light hydrocarbons in their constituent molecules of H2, CO, CO2, etc.

The catalytic reactor in the second stage may operate at GHSV's ranging from 1000-20,000 inverse hours, most preferably in the 2,000-7,000 range. The temperature of operation would be 700-1000 C, most likely in the 800-900 C range. The exact operating conditions would be a function of desired conversion, feed properties, and catalyst life. The tubular reactor system is installed in a fired furnace not unlike a Steam Methane Reformer furnace or ethylene furnace. The catalyst will require regeneration on some frequency to maintain activity. The regeneration is effected by mild oxidation of the carbon deposited on the catalyst, although steam or hydrogen regeneration in a reducing atmosphere can also be practiced.

The second stage of the BRR reduces the tars by cracking the tars out of the gas stream and does use a catalyst. The second stage reduces the methane percentage by steam-reforming the methane into smaller molecules such as CO, $CO_2$, and $H_2$. The resultant chemical grade synthesis gas will be substantially tar-free (less than 100 ppm total tars including benzene and naphthalene and more likely less than 5 ppm) with methane content as low as 2% (dry basis) and certainly no higher than 10%.

The output of the second stage is sent to a syngas cleanup section to remove additional trace contaminants from the syngas, such as sulfur, water, and potassium, and other trace contaminants before sending the chemical grade syngas to downstream chemical processes, selected from a methanol synthesis reactor, a Methanol-to-Gasoline reactor train process, a low temperature Fischer-Tropsch reactor train, or another chemical process that uses the reaction syngas product derived from biomass in the bio-reforming reactor.

In an embodiment, a tubular reactor with an operating temperature over 1100 degrees C. can substantially crack all of the tars and methane without a catalyst. A tubular reactor with lower operating temperatures can also crack these molecules with the assist of a catalyst.

As part of the plant integration, some of the raw syngas may bypass the Stage 2 catalytic reformer so as to maintain a high calorific value as use for fuel gas in the rest of the plant. This will especially be true for those cases requiring higher greenhouse gas reduction or for those where natural gas is not readily available at reasonable cost. This fuel gas could be used for generating steam, firing furnaces, supplemental fuel to the char combustor, and other places where natural gas might typically be used. Also, beneficial carbon credits may be generated for using this raw syngas from the integrated plant over natural gas.

Referring back to FIG. 7, the integrated plant may have a biomass feed supply system, an interconnected set of two or more stages of reactors 101, 103 to form a bio-reforming reactor, a gas clean up section, a steam methane reformer in parallel with bio-reforming reactor, and any of a methanol synthesis reactor, a Methanol-to-Gasoline reactor train process, a high temperature Fischer-Tropsch reactor train, or another chemical process that uses the reaction syngas product derived from the decomposition in the bio-reforming reactor and syngas from the steam methane reformer.

In the biomass feed supply system, the biomass may be stored as chips. The conveyor may bring the chips of biomass over to a filter/screen that make sure that the chip size is within limits, such as underneath 2 inches of length of chip of biomass. After the screening of the chip size, the biomass chips may be fed to a size reduction step such as a Hammermill. The Hammermill may then feed the chips to second screen to make sure that the chip size is within limits, such as underneath ¾ inches of length of chip of biomass. A conveyor may bring the chips through the second screen to either 1) a chip dryer or 2) to a biomass pre-treatment process to make smaller particles of biomass. The moist fine moist particles of biomass go to a dryer system and become biomass in a dried powered form. The dried powdered form of biomass may be stored in a silo. The biomass may be stored as chips.

The moisture content of the biomass can range from say 3-5% to as high as 35%. The integrated plant may have drying options that can include flash dryers, rotary drum dryers, or belt dryers. The integrated plant may dry in a low oxygen atmosphere for safety reasons including prevention of fires as well as inert gases from other parts of the process can be re-used and integrated as a supply into the dryers.

The biomass maybe fed to a lock hopper, where an entrainment feed gas system feeds the dried biomass into a circulating fluidized bed bioreactor. Alternatively, the chips of biomass in their slightly wet form also may go through a biomass chip dryer system and then be stored as half-inch to three-quarter inch chips of biomass in a silo tank. The chips of biomass are then fed through a conveyor to a chip lock hopper and feed system into the circulating fluidized bed bio reformer in the first stage 101.

The circulating fluidized bed bio reformer produces the raw syngas and other reaction products sent to the cyclone and moving bed in the outlet of the first stage 101. The gases from the first cyclone may be fed to one of three pathways. The first potential pathway is through a catalytic reactor second stage system 103. The second potential pathway is through a thermal reactor second stage system 103. The thermal second stage system that operates a higher temperature may be a radiant heat reactor. The pathway through the thermal reactor does not need to use a catalyst but rather operates at a higher temperature.

In any of the possible stage 2 reactors, the second stage reduces the methane percentage by steam-reforming the methane into smaller molecules such as CO, $CO_2$, and $H_2$. The second stage of the BRR reduces the tars by cracking the light tars and virtually all of the heavy tars out of the chemical grade syngas stream. The chemical grade syngas stream from the second stage is sent to a syngas cleanup section to remove additional contaminants from the syngas, such as sulfur, water, and potassium, and other contaminants before sending the chemical grade syngas to downstream chemical processes.

The integrated plant includes the multiple stage bio-reforming reactor that generates a chemical grade syngas that is supplied to a transportation fuel back-end such as gasoline or high temperature Fischer Tropsch fuel products. The integrated plant receives raw biomass such as pine wood and converts the biomass into the transportation fuel. The integrated plant may use diverse biomass feedstocks and feedstock preparation methods (including chip size and powder size). The integrated plant may have a flexible configuration to feed reaction products (of both natural gas and biomass, or biomass only fed into the bio-reforming reactor) to meet regional requirements and to maximize economics.

In an embodiment, the two or more stages, such as the 1st stage and 2nd stage, forming the bio-reforming reactor converts the solid biomass from the chunk or particle preparation step into gaseous reactants including $CH_4$, $H_2$, $CO_2$, & CO. The syngas produced by the bio-reforming reactor can be low in carbon dioxide because by design a substantially stoichiometric amount of steam is supplied into the reactor and no additional oxygen is supplied as a reactant or fuel to drive the reaction in the decomposition reaction. Thus, a very low amount of oxygen is present and the decomposition reaction produces mainly CO rather than $CO_2$. The syngas from the biomass reforming reactor is also low in nitrogen, low in ammonia, low in sulfur content, and low in hydrogen cyanide (HCN). For example, the sulfur content of the syngas gas coming out of the bio-reforming reactor is barely over one part per million after the clean-up steps. In an embodiment, right out of the bio reforming reactor itself, the syngas stream could contain sulfur as high as 50 ppm; and the same is true for other constituents such as HCN, $NH_3$, etc. The woodchips used to produce the particles of biomass generally have a low sulfur content. Barely trace amounts of HCN, ammonia, are generated and trace amounts of nitrogen are present making the syngas virtually free of nitrogen, ammonia, and HCN, in the syngas stream coming out of the bio-reforming reactor. In contrast, syngas from coal contains high quantities of sulfur, amine, and HCN. Accordingly, the syngas cleanup components downstream of the bio-reforming reactor can be less inclusive and exclude some of the gas cleanup components needed for other biomass syngas producers, such as a coal-based syngas. Thus, compared to a coal-based syngas, an ammonia removal plant is not needed, a HCN removal plant is not needed, a nitrogen purge is not needed, and merely either the bulk sulfur removal or a sulfur guard bed is needed but not both. The lack of having to put multiple contaminant removal steps into the gas cleanup portion of the integrated plant reduces both capital expenses for constructing and installing in that equipment as well as reducing operating expenses for having to operate the additional gas removal equipment and replace their catalysts/filters to remove the contaminants from the syngas stream.

The syngas stream from the decomposition coming out of the bio-reforming reactor may have a 1.1:1 or a 1.2:1 hydrogen to carbon monoxide ratio. A ratio controller with sensors located at the input of the high temperature Fischer-Tropsch train will control the hydrogen to carbon monoxide ratio of syngas going into the Fischer-Tropsch train. The ratio will be about 1.5:1 to 2.0:1 hydrogen to carbon monoxide controlled by the controller and measured by hydrogen and carbon monoxide sensors at that input. In an embodiment, H2:CO ratios of 1.8:1 to as high as 2.1:1 are in the syngas stream because of the steam in the process and the amount of water gas shift that goes on. The downside is that too much CO2 may be made for the Fischer-Tropsch train and some CO2 removal may be inline or an additive may be added in the reactor process itself. However, the syngas to Methanol (MEOH) train does not mind CO2 since it is a chemical reactant in this process. Sensors can also be located at the output of the bio-reforming reactor as well as the steam methane reforming reactor to have a ratio control system to know what the molarity of the syngas being supplied by each of these reactors is in order to know the proper volumes to mix to get the end result of having a combined syngas from the steam methane reforming reactor and the bio-reforming reactor between, for example, the range of 1.5:1 and 2.0:1. The ratio control system will also send feedback to both the bio-reforming reactor and the steam methane reforming reactor in order to control the volume of syngas being produced by both of those reactors.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

The invention claimed is:

1. An integrated plant, comprising:
  an interconnected set of two or more stages of reactors to form a bio-reforming reactor that generate chemical grade bio-syngas for any of 1) a methanol synthesis reactor, 2) a Methanol-to-Gasoline reactor train, 3) a high temperature Fischer-Tropsch reactor train, and 4) any combination of these three, that use the chemical grade bio-syngas derived from biomass fed into the bio-reforming reactor,
  where a first stage of the bio-reforming reactor includes a first reactor that has one or more stream inputs to feed heat absorbing media, a vessel to circulate the heat absorbing media, one or more supply inputs to feed the biomass including wood chips, and has a sparger to input steam, where the first stage is configured to cause a chemical reaction of the biomass including the wood chips into its reaction products of constituent gases, tars, chars, and other components, which exit as raw syngas through a reactor output from the first stage, and
  a tubular chemical reactor of a second stage of the bio reforming reactor that has two or more inputs configured to receive chemical feedstock from at least two sources, i) the raw syngas from the reactor output of the first stage via a cyclone, and ii) purge gas containing renewable carbon-based gases that are recycled back via a recycle loop as a chemical feedstock from any of 1) the downstream methanol-synthesis-reactor train, 2) the downstream methanol-to-gasoline reactor train, or 3) purge gas from both trains, where the tubular chemical reactor has a first input configured to receive the raw syngas from the first stage that includes the constituent gases and at least some of the tars, and has a second input configured to receive the renewable carbon based gases from the purge gases, where the tubular chemical reactor employs a catalyst tailored to crack phenolic tars (C6+) and reform light hydrocarbon gases (C1-C4) contained in any of 1) the raw syngas from the first stage of the bio-reforming reactor and 2) purge gases from the recycle loop in order to remove the tars and light hydrocarbon gases; and thus, create the chemical grade bio-syngas that is then sent out an output of the tubular chemical reactor; and
  a downstream fuel train that is configured to receive the chemical grade bio-syngas derived from the biomass that includes the wood chips, where the downstream fuel train is selected from a group consisting of any of 1) the methanol synthesis reactor, 2) the Methanol-to-Gasoline reactor train, 3) the high temperature Fischer-Tropsch reactor train, and 4) any combinations of these three, that use the chemical grade bio-syngas derived from the biomass in the bio-reforming reactor to produce any of 1) fuel products with 100% biogenic carbon content, 2) fuel products with 50-100% biogenic carbon content, and 3) any combination of fuel products with solely 100% biogenic carbon content as well as fuel products with 50-100% biogenic carbon content.

2. The integrated plant of claim 1, further comprising:
  a steam methane reformer that is configured to generate a stream of exit gases selected from a group consisting of 1) hydrogen gas, 2) a hydrogen-rich syngas composition, in which a ratio of hydrogen-to-carbon monoxide is higher than a ratio generally needed for methanol synthesis or Fischer-Tropsch processes, and 3) any combination of the two, to be mixed with a potentially carbon-monoxide-rich syngas composition, in which a ratio of carbon monoxide to hydrogen is higher than the ratio generally needed for methanol synthesis or Fischer-Tropsch processes, where the carbon-monoxide-rich syngas composition is from the chemical grade bio-syngas produced by the second stage, where the steam methane reformer has an input to receive at least natural gas supplied to its input, where a hydrogen pressure swing absorber is configured to separate out any hydrogen gas from the purge gas from the methanol-synthesis-reactor train or the Fischer-Tropsch train, and a syngas combiner and compression unit that is configured to receive chemical feedstock gas from all three of i) the chemical grade bio-syngas produced by the second stage, ii) the exit gases from the steam methane reformer, and iii) the hydrogen from the hydrogen pressure swing absorber, to locally control a feed modulus ratio for a hydrogen to carbon monoxide ratio needed for methanol synthesis or high temperature Fischer-Tropsch processes.

3. The integrated plant of claim 2, where the steam methane reformer also has an input to receive purge gases from the hydrogen pressure swing absorber from the methanol synthesis train, where the methanol produced by the methanol synthesis reactor has a 50%-100% biogenic carbon content.

4. The integrated plant of claim 2, further comprising:
a fuel gas mixing and distribution unit that has a natural gas input to receive natural gas in addition to a purge gas input to receive purge gases containing renewable carbon based gases from both the methanol-to-gasoline reactor train and the hydrogen pressure swing absorber connected to the methanol-synthesis-reactor train, where the fuel gas mixing and distribution unit is also configured to distribute fuel gas to at least i) heaters in the tubular chemical reactor of the second stage and ii) heaters in the Methanol-to-Gasoline train, where the gasoline produced by the methanol-to-gasoline has a 100% biogenic carbon content.

5. The integrated plant of claim 1, further comprising:
a carbon-dioxide gas feedback loop that is configured to cooperate with a $CO_2$ separation unit to supply a fraction of the $CO_2$ gas that is removed from the chemical grade bio-syngas produced from the reactor output of the tubular chemical reactor of the second stage to supply extracted $CO_2$ gas to a biomass feed system, where the $CO_2$ gas is supplied to at least biomass dryers to dry and be motive gas for the biomass including the wood chips, where the biomass is subsequently supplied to the one or more feed supply inputs of the circulating fluidized bed reactor;

where the methanol-synthesis-reactor train is configured to couple downstream of the $CO_2$ separation unit and a syngas compression unit to receive the chemical grade bio-syngas as a chemical feedstock in order to generate methanol from the chemical grade bio-syngas derived from the biomass, and where the tubular chemical reactor of the second stage has two or more inputs configured to receive the chemical feedstock from both i) a first input to receive the raw syngas from the output of the reactor into a first set of tubes of the tubular chemical reactor and ii) a second input connected to a second set of tubes of the tubular chemical reactor to receive both 1) the purge gas from the methanol-synthesis-reactor train that is recycled back to the tubular chemical reactor of the bio reforming reactor to recover any hydrogen and carbon-based purge gases as well as 2) natural gas, and then convert all of them into the chemical grade bio-syngas produced by the reactor output of the tubular chemical reactor of the second stage.

6. The integrated plant of claim 1, where the tubular chemical reactor of the second stage is configured to operate as a multi-purpose reformer to concurrently process i) natural gas with recycled process gases from the downstream fuel train coming from a first purge gas recycle loop, where the natural gas with recycled process gases are reformed in a first set of tubes, in conjunction with ii) the raw syngas from the reactor output of the first stage being reformed in a second set of tubes.

7. The integrated plant of claim 1, further comprising:
a hydrogen pressure swing absorber that is configured to separate out hydrogen gas from the purge gas of the downstream methanol-synthesis-reactor train, and to send the renewable carbon based gases including CO and $CO_2$ via the recycle loop to an input of the second stage of the bio-reforming reactor, and where the hydrogen pressure swing absorber is also configured to send the hydrogen to an input of methanol-synthesis-reactor train; and where the tubular chemical reactor is configured to receive the purge gas that is recycled back via the recycle loop as a chemical feedstock from the downstream methanol-synthesis-reactor train and receive liquefied petroleum gas (LPG) from the downstream methanol-to-gasoline reactor train as a chemical feedstock via the recycle loop.

8. The integrated plant of claim 1, further comprising:
a fuel gas mixing and distribution unit that has a natural gas input to receive natural gas, in addition to a purge gas input to receive purge gases from both the methanol-to-gasoline reactor train and the methanol-synthesis-reactor train, and in addition to a syngas input to receive the raw syngas from the reactor output of the first stage, and where the fuel gas mixing and distribution unit is also configured to distribute fuel gas to at least heaters in the tubular chemical reactor of the second stage and heaters in the Methanol-to-Gasoline train, where the gasoline produced by the methanol-to-gasoline has a 50% to 100% biogenic carbon content.

9. The integrated plant of claim 1, where the second stage includes heaters for the tubular chemical reactor of the second stage to maintain an operating temperature of that reactor of at least 700 degree C., where a fuel gas mixing and distribution component is configured to receive fuel gas from a number of sources including a tail gas from a hydrogen pressure swing absorber from the downstream methanol-synthesis-reactor train as well as unused process gases including liquefied petroleum gas (LPG) from the methanol-to-gasoline train, where the fuel gas mixing and distribution component distributes that fuel gas via a fuel gas feedback loop of hydrogen and/or carbon-based gases that connect to i) the heaters for the tubes of the tubular chemical reactor in order to crack the tars and reform the light hydro carbons as well as ii) to heaters in the methanol-to-gasoline train, where the downstream fuel trains that use the chemical grade bio-syngas derived from the biomass in the bio-reforming reactor are themselves configured to produce fuel products with 50-100% biogenic carbon content.

10. The integrated plant of claim 1, further comprising:
a hydrogen recirculation feedback loop that is configured to cooperate with a hydrogen pressure swing absorber to recover hydrogen gas from purge gas from the downstream methanol-synthesis-reactor train, where the recovered hydrogen gas is to be combined with the chemical grade bio-syngas supplied from the tubular chemical reactor and a hydrogen rich syngas stream from a steam methane reformer in order to control a methanol feed modulus ratio for a hydrogen to carbon monoxide ratio needed for methanol synthesis, where the hydrogen pressure swing absorber is also configured to send the carbon-rich tail gases back to an input of a steam methane reformer, and where the downstream methanol-synthesis-reactor train is configured to take in i) the chemical grade bio-syngas, ii) recovered hydrogen, and iii) hydrogen rich syngas from a steam methane reformer as a chemical feedstock to generate methanol for the methanol-to-gasoline train, where any subsequent gasoline produced from the methanol-to-gasoline reactor train has a biogenic carbon content between 50% and 100%.

11. A method for an integrated plant, comprising:

operating an interconnected set of two or more stages of reactors to form a bio-reforming reactor that generate chemical grade bio-syngas for any of 1) a methanol synthesis reactor, 2) a Methanol-to-Gasoline reactor train, 3) a high temperature Fischer-Tropsch reactor train, and 4) any combination of these three, that use the chemical grade bio-syngas derived from biomass fed into the bio-reforming reactor, operating a first stage of the bio-reforming reactor that includes a first reactor that has one or more stream inputs to feed heat absorbing media, a vessel to circulate the heat absorbing media, one or more supply inputs to feed the biomass including wood chips, and has a sparger to input steam, where the first stage is configured to cause a chemical reaction of the biomass including the wood chips into its reaction products of constituent gases, tars, chars, and other components, which exit as raw syngas through a reactor output from the first stage, and operating a tubular chemical reactor of a second stage of the bio reforming reactor that has one or more inputs configured to receive chemical feedstock from at least two sources, i) the raw syngas from the reactor output of the first stage via a cyclone, and ii) purge gas containing renewable carbon-based gases that are recycled back via a recycle loop as a chemical feedstock from any of 1) the downstream methanol-synthesis-reactor train, 2) the downstream methanol-to-gasoline reactor train, or 3) purge gas from both trains, where the tubular chemical reactor has a first input configured to receive the raw syngas from the first stage that includes the constituent gases and at least some of the tars, and has a second input configured to receive the renewable carbon based gases from the purge gases, where the tubular chemical reactor employs a catalyst bed tailored to crack phenolic tars (C6+) and reform light hydrocarbon gases (C1-C4) contained in any of 1) the raw syngas from the first stage of the bio-reforming reactor and 2) purge gases from the recycle loop in order to remove the tars and light hydrocarbon gases; and thus, create the chemical grade bio-syngas that is then sent out an output of the tubular chemical reactor; and operating a downstream fuel train that is configured to receive the chemical grade bio-syngas derived from the biomass that includes the wood chips, where the downstream fuel train is selected from a group consisting of any of 1) the methanol synthesis reactor, 2) the Methanol-to-Gasoline reactor train, 3) the high temperature Fischer-Tropsch reactor train, and 4) any combinations of these three, that use the chemical grade bio-syngas derived from the biomass in the bio-reforming reactor to produce any of 1) fuel products with 100% biogenic carbon content, 2) fuel products with 50-100% biogenic carbon content, and 3) any combination of fuel products with solely 100% biogenic carbon content as well as fuel products with 50-100% biogenic carbon content.

12. The method for the integrated plant of claim 11, further comprising:

operating a steam methane reformer to generate a stream of exit gases selected from a group consisting of 1) hydrogen gas, 2) a hydrogen-rich syngas composition, in which a ratio of hydrogen-to-carbon monoxide is higher than a ratio generally needed for methanol synthesis or Fischer-Tropsch processes, and 3) any combination of the two, to be mixed with a potentially carbon-monoxide-rich syngas composition, in which a ratio of carbon monoxide to hydrogen is higher than the ratio generally needed for methanol synthesis or Fischer-Tropsch processes, where the carbon-monoxide-rich syngas composition is from the chemical grade bio-syngas produced by the second stage, where the steam methane reformer has an input to receive at least natural gas supplied to its input, operating a hydrogen pressure swing absorber that is configured to separate out any hydrogen gas from the purge gas from the methanol-synthesis-reactor train or the Fischer-Tropsch train, and operating a syngas combiner and compression unit that is configured to receive chemical feedstock gas from all three of i) the chemical grade bio-syngas produced by the second stage, ii) the exit gases from the steam methane reformer, and iii) the hydrogen from the hydrogen pressure swing absorber, to locally control a feed modulus ratio for a hydrogen to carbon monoxide ratio needed for methanol synthesis or high temperature Fischer-Tropsch processes.

13. The method for the integrated plant of claim 12, where the steam methane reformer also has an input to receive purge gases from the hydrogen pressure swing absorber from the methanol synthesis train, where the methanol produced by the methanol synthesis reactor has a 50%-100% biogenic carbon content.

14. The method for the integrated plant of claim 12, further comprising:

operating a fuel gas mixing and distribution unit that has a natural gas input to receive natural gas in addition to a purge gas input to receive purge gases containing renewable carbon based gases from both the methanol-to-gasoline reactor train and the hydrogen pressure swing absorber connected to the methanol-synthesis-reactor train, where the fuel gas mixing and distribution unit is also configured to distribute fuel gas to at least i) heaters in the tubular chemical reactor of the second stage and ii) heaters in the Methanol-to-Gasoline train, where the gasoline produced by the methanol-to-gasoline has a 100% biogenic carbon content.

15. The method for the integrated plant of claim 11, further comprising:

operating a carbon-dioxide gas feedback loop that cooperates with a $CO_2$ separation unit to supply a fraction of the $CO_2$ gas that is removed from the chemical grade bio-syngas produced from the reactor output of the tubular chemical reactor of the second stage to supply extracted $CO_2$ gas to a biomass feed system, where the $CO_2$ gas is supplied to at least biomass dryers to dry and be motive gas for the biomass including the wood chips, where the biomass is subsequently supplied to the one or more feed supply inputs of the circulating fluidized bed reactor;

operating the methanol-synthesis-reactor train that is coupled downstream of the CO2 separation unit and a syngas compression unit to receive the chemical grade bio-syngas as a chemical feedstock in order to generate methanol from the chemical grade bio-syngas derived from the biomass, and where the tubular chemical reactor of the second stage has two or more inputs configured to receive the chemical feedstock from both i) a first input to receive the raw syngas from the output of the reactor into a first set of tubes of the tubular chemical reactor and ii) a second input connected to a second set of tubes of the tubular chemical reactor to receive both 1) the purge gas from the methanol-synthesis-reactor train that is recycled back to the tubular chemical reactor of the bio reforming reactor to recover any hydrogen and carbon-based purge gases as well as 2) natural gas, and then convert all them into the chemical grade bio-syngas produced by the reactor output of the tubular chemical reactor of the second stage.

16. The method for the integrated plant of claim 11, further comprising:

operating the tubular chemical reactor of the second stage as a multi-purpose reformer to concurrently process i) natural gas with recycled process gases from the downstream fuel train coming from a first purge gas recycle loop, where the natural gas with recycled process gases are reformed in a first set of tubes, in conjunction with ii) the raw syngas from the reactor output of the first stage being reformed in a second set of tubes.

17. The method for the integrated plant of claim 11, further comprising:

operating a hydrogen pressure swing absorber to separate out hydrogen gas from the purge gas of the downstream methanol-synthesis-reactor train, and to send the renewable carbon based gases including CO and CO2 via the recycle loop to an input of the second stage of the bio-reforming reactor, where the hydrogen pressure swing absorber is also configured to send the hydrogen to an input of methanol-synthesis-reactor train; and where the tubular chemical reactor is configured to receive the purge gas that is recycled back via the recycle loop as a chemical feedstock from the downstream methanol-synthesis-reactor train and receive liquefied petroleum gas (LPG) from the downstream methanol-to-gasoline reactor train as a chemical feedstock via the recycle loop.

18. The method for the integrated plant of claim 11, further comprising:

operating a fuel gas mixing and distribution unit that has a natural gas input to receive natural gas in addition to a purge gas input to receive purge gases from both the methanol-to-gasoline reactor train and the methanol-synthesis-reactor train, and in addition to a syngas input to receive the raw syngas from the reactor output of the first stage, and where the fuel gas mixing and distribution unit is also configured to distribute fuel gas to at least heaters in the tubular chemical reactor of the second stage and heaters in the Methanol-to-Gasoline train, where the gasoline produced by the methanol-to-gasoline has a 50% to 100% biogenic carbon content.

19. The method for the integrated plant of claim 11, where the second stage includes heaters for the tubular chemical reactor of the second stage to maintain an operating temperature of that reactor of at least 700 degree C., where a fuel gas mixing and distribution component is configured to receive fuel gas from a number of sources including a tail gas from a hydrogen pressure swing absorber from the downstream methanol-synthesis-reactor train as well as unused process gases including liquefied petroleum gas (LPG) from the methanol-to-gasoline train, where the fuel gas mixing and distribution component distributes that fuel gas via a fuel gas feedback loop of hydrogen and/or carbon-based gases that connect to i) the heaters for the tubes of the tubular chemical reactor in order to crack the tars and reform the light hydro carbons as well as ii) to heaters in the methanol-to-gasoline train, where the downstream fuel trains that use the chemical grade bio-syngas derived from the biomass in the bio-reforming reactor are themselves configured to produce fuel products with 50-100% biogenic carbon content.

20. The method for the integrated plant of claim 11, further comprising:

operating a hydrogen recirculation feedback loop that is configured to cooperate with a hydrogen pressure swing absorber to recover hydrogen gas from purge gas from the downstream methanol-synthesis-reactor train, where the recovered hydrogen gas is to be combined with the chemical grade bio-syngas supplied from the tubular chemical reactor and a hydrogen rich syngas stream from a steam methane reformer in order to control a methanol feed modulus ratio for a hydrogen to carbon monoxide ratio needed for methanol synthesis, where the hydrogen pressure swing absorber is also configured to send the carbon-rich tail gases back to an input of a steam methane reformer, and where the downstream methanol-synthesis-reactor train is configured to take in i) the chemical grade bio-syngas, ii) recovered hydrogen, and iii) hydrogen rich syngas from a steam methane reformer as a chemical feedstock to generate methanol for the methanol-to-gasoline train, where any subsequent gasoline produced from the methanol-to-gasoline reactor train has a biogenic carbon content between 50% and 100%.

* * * * *